(12) United States Patent
Fujibayashi et al.

(10) Patent No.: US 10,154,280 B2
(45) Date of Patent: Dec. 11, 2018

(54) PREDICTIVE ENCODING METHOD, PREDICTIVE ENCODING DEVICE, AND PREDICTIVE ENCODING PROGRAM OF MOTION VECTOR, AND, PREDICTIVE DECODING METHOD, PREDICTIVE DECODING DEVICE, AND PREDICTIVE DECODING PROGRAM OF MOTION VECTOR

(71) Applicant: NTT DOCOMO, Inc., Tokyo (JP)

(72) Inventors: Akira Fujibayashi, Tokyo (JP); Yoshinori Suzuki, Tokyo (JP); Choong Seng Boon, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 15/872,932

(22) Filed: Jan. 16, 2018

(65) Prior Publication Data

US 2018/0146209 A1 May 24, 2018

Related U.S. Application Data

(63) Continuation of application No. 15/374,929, filed on Dec. 9, 2016, now Pat. No. 9,877,040, which is a
(Continued)

(30) Foreign Application Priority Data

Jan. 7, 2011 (JP) .................................. 2011-002205

(51) Int. Cl.
*H04N 7/12* (2006.01)
*H04N 19/52* (2014.01)
(Continued)

(52) U.S. Cl.
CPC ............ *H04N 19/52* (2014.11); *H04N 19/105* (2014.11); *H04N 19/61* (2014.11); *H04N 19/172* (2014.11); *H04N 19/184* (2014.11)

(58) Field of Classification Search
CPC ............................. H04N 19/52; H04N 19/105
(Continued)

(56) References Cited

U.S. PATENT DOCUMENTS 5,555,033 A * 9/1996 Bazzaz .................. H04N 5/145
348/699
2009/0129472 A1 * 5/2009 Panusopone ........... H04N 19/56
375/240.16

FOREIGN PATENT DOCUMENTS

JP 2010-515399 A 5/2010
WO WO 2012/093585 A1 7/2012

OTHER PUBLICATIONS

Bossen, F., Kosse, P., "Simplified motion vector coding method," Jul. 16, 2010, pp. 1-5, Joint Collaborative Team on Video Coding (JCT-VC) of ITU-T SG16 WP3 and ISO/IEC JTC1/SC29/WG11, JCTVC-B094, 2$^{nd}$ Meeting: Geneva, Switzerland.
(Continued)

*Primary Examiner* — Richard T Torrente
(74) *Attorney, Agent, or Firm* — Brinks Gilson & Lione

(57) ABSTRACT

A predictive coding system can encode motion vectors by determining a motion vector of a target partition in a frame picture of an encoding target; determining a first motion vector predictor candidate from a motion vector or motion vectors of one or more partitions belonging to a left-neighboring region to the target partition; determining a second motion vector predictor candidate from a motion vector or motion vectors of one or more partitions belonging to an above-neighboring region to the target partition; selecting an optimum motion vector predictor and outputting motion vector predictor indication information to specify the
(Continued)

selected optimum motion vector predictor, the optimum motion vector predictor selected based on comparison between one or more motion vector predictor candidates including the first motion vector predictor candidate and the second motion vector predictor candidate, and the motion vector of the target partition; and encoding the motion vector predictor indication information.

2 Claims, 15 Drawing Sheets

Related U.S. Application Data continuation of application No. 13/936,005, filed on Jul. 5, 2013, now Pat. No. 9,693,052, which is a continuation of application No. PCT/JP2011/079540, filed on Dec. 20, 2011.

(51) Int. Cl.
*H04N 19/61* (2014.01)
*H04N 19/105* (2014.01)
*H04N 19/172* (2014.01)
*H04N 19/184* (2014.01)

(58) Field of Classification Search
USPC ..................................................... 375/240.16
See application file for complete search history.

(56) References Cited

OTHER PUBLICATIONS

"Test Model Under Consideration," Oct. 6, 2010, pp. 1-20, 35-38, 78-93, Joint Collaborative Team on Video Coding (JCT-VC) of ITU-T SG16 WP3 and ISO/IEC JTC1/SC29/WG11, JCT5VC-B205, 2$^{nd}$ Meeting, Geneva, Switzerland.
McCann, K., Han, W.J., Kim, I.K., "Samsung's Response to the Call for Proposals on Video Compression Technology," Apr. 15-23, 2010, pp. 1-12, Joint Collaborative Team on Video Coding (JCT-VC) of ITU-T SG16 WP3 and ISO/IEC JTC1/SC29/WG11, JCTVC-A124, 1$^{st}$ Meeting: Dresden, Germany.
Lin, J.L., Chen, Y.W., Tsai, Y.P., Huang, Y.W., Lei, S., "Motion Vector Coding Techniques for HEVC," Oct. 2011, pp. 1-6, IEEE 13$^{th}$ International Workshop on Multimedia Signal Processing (MMSP 2011).
International Search Report dated Mar. 27, 2012 in International Application No. PCT/JP2011/079540, pp. 1-2, International Searching Authority, Japanese Patent Office, Tokyo, Japan.
Ken McCann, et al., "Samsung's Response to the Call for Proposals on Video Compression Technology," JCTVC-A124, pp. 1-42, dated Apr. 15, 2010, Joint Collaborative Team on Video Coding (JCT-VC) of ITU-T SG16 WP3 and ISO/IEC JTC1/SC29/WG11, 1$^{st}$ Meeting, Dresden, Germany.
Korean Office Action, dated Sep. 3, 2015, pp. 1-7, issued in Korean Patent Application No. 10-2013-7015618, Korean Intellectual Property Office, Daejeon, Republic of Korea.
Wiegand, T et al.: "*High Efficiency Video Coding (HEVC) text specification Workind Draft 1*", pp. 1-137, 3$^{rd}$ JCT-VC Meeting; 95. MPEG Meeting; Oct. 7, 2010-Oct. 15, 2010; Guangzhou, CN; (Joint Collaborative Team on Video Coding of ISO/IECJTC1/SC29/WG11 and ITU-T SG.16 ); URL: http://wftp3.itu.int/av-arch/jctvc-site/, Jan. 6, 2011, Doc No. JCTVC-C403, XP030008032.
Amonou, (FT) I et al, "Annex A CDCM Video Codec: Decoder Specification," Video coding technology proposal by France Telecom, NTT, NTT DOCOMO, Panasonic and Technicolor, May 7, 2010,
pp. 1-107, 1$^{st}$ Joint Collaborative Team on Video Coding of ISO/IEC JTC1/SC29/WGII and ITU-T SG.16, Apr. 15-23, 2010, Dresden, DE, Document No. JCTVC-A114-Annex A, XP030007553.
Lin, Jian-Liang et al, "Motion vector coding techniques for HEVC", Oct. 17, 2011, pp. 1-6, Multimedia Signal Processing (MMSP), XP032027557, © 2011 IEEE.
Lin, J.L. et al, "*Improved Advanced Motion Vector Prediction*", pp. 1-8, 4$^{th}$ JCT-VC Meeting; 95. MPEG Meeting; Jan. 20, 2011-Jan. 28, 2011; Daegu, KR; (Joint Collaborative Team on Video Coding of ISO/IEC JTC1/SC29/WG11and ITU-T SG.16 ); URL: http://wftp3.itu.int/av-arch/jctvc-site, Doc. No. JCTVC-D125, Jan. 15, 2011, XP030008165.
Fujibayashi, A., et al. (NTT DOCOMO), "*CE9: 3.2d Simplified motion vector prediction*", pp. 1-6, 4$^{th}$ JCT-VC Meeting; 95. MPEG Meeting; Jan. 20, 2011-Jan. 28, 2011; Daegu, KR; (Joint Collaborative Team on Video Coding of ISO/IEC JTC1/SC29/WG11and ITU-T SG.16 ); URL: http://wftp3.itu.int/av-arch/jc tvc-site/, Doc. No. JCTVC-D231, Jan. 15, 2011 (Jan. 15, 2011), XP030008271.
Extended European Search Report, dated Sep. 24, 2015, pp. 1-10, issued in European Patent Application No. 15165896.0, European Patent Office, Munich, Germany.
Extended European Search Report, dated Sep. 24, 2015, pp. 1-10, issued in European Patent Application No. 15166363.0, European Patent Office, Munich, Germany.
Extended European Search Report, dated Oct. 5, 2015, pp. 1-11, issued in European Patent Application No. 11855027.6, European Patent Office, Munich, Germany.
Canadian Office Action, dated Nov. 3, 2015, pp. 1-5, issued in Canadian Patent Application No. 2,823,880, Canadian Intellectual Property Office, Gatineau, Quebec, Canada.
Korean Office Action with English translation, dated Dec. 24, 2015, pp. 1-5, issued in Korean Patent Application No. 10-2013-7015618, Korean Intellectual Property Office, Daejeon, Republic of Korea.
Wiegand, T., et al., "WD1: Working Draft 1 of High-Efficiency Video Coding," pp. 1-8, dated Oct. 15, 2010, Document JCTVC-C403, Joint Collaborative Team on Video Coding (JCT-VC) of ITU-T SG16 WP3 and ISO/IEC JTC1/SC29/WG11, 3$^{rd}$ Meeting, Guangzhou, CN, Oct. 7-15, 2010.
Chinese Office Action with English translation, dated Jan. 6, 2016, pp. 1-28, issued in Chinese Patent Application No. 201180064343. 9, The State Intellectual Property Office of China, Beijing, China.
Korean Office Action with English translation, dated May 13, 2016, pp. 1-9, issued in Korean Patent Application No. 10-2016-7007353, Korean Intellectual Property Office, Daejeon, Republic of Korea.
Indonesian Office Action with English translation, dated Jun. 8, 2016, pp. 1-4, issued in Indonesian Patent Application No. W00201303610-TA, Indonesia Intellectual Property Office, Jakarta Selatan, Indonesia.
Korean Intellectual Property Tribunal 8$^{th}$ Board Trial Decision with translation, dated Sep. 23, 2016, pp. 1-14, issued in Korean Patent Application No. 10-2013-7015618, Korean Intellectual Property Office, Daejeon, Republic of Korea.
Chinese Office Action, dated Mar. 1, 2017, with translation, pp. 1-25, issued in Chinese Patent Application No. 201610299506.6, The State Intellectual Property Office of China.
Taiwanese Office Action, dated Aug. 31, 2017, with translation, pp. 1-12, issued in Taiwanese Patent Application No. 105129816, Taiwanese Patent Office. Taipei City, Taiwan.
Korean Office Action, dated Feb. 1, 2018, pp. 1-7, Korean Application No. 10-2017-7034131, Korean Intellectual Property Office, Daejeon, Republic of Korea.
Canadian Office Action, dated Jan. 29, 2018, pp. 1-5, issued in Canadian Patent Application No. 2,933,341, Canadian Intellectual Property Office, Gatineau, Canada.
European Office Action, dated Oct. 17, 2018, pp. 1-5, issued in European Patent Application No. 15 165 896.0, European Patent Office, Berlin, Germany.

\* cited by examiner

PREDICTIVE ENCODING METHOD, PREDICTIVE ENCODING DEVICE, AND PREDICTIVE ENCODING PROGRAM OF MOTION VECTOR, AND, PREDICTIVE DECODING METHOD, PREDICTIVE DECODING DEVICE, AND PREDICTIVE DECODING PROGRAM OF MOTION VECTOR

This application is a continuation of U.S. patent application Ser. No. 15/374,929, filed Dec. 9, 2016, which is a continuation of U.S. patent application Ser. No. 13/936,005 filed Jul. 5, 2013, which is a continuation of PCT/JP2011/079540, filed Dec. 20, 2011, which claims the benefit of the filing date pursuant to 35 U.S.C. § 119(e) of JP2011-002205, filed Jan. 7, 2011, all of which are incorporated herein by reference.

TECHNICAL FIELD

Embodiments of the present invention relate to a predictive encoding method, a predictive encoding device, and a predictive encoding program of motion vector and to a predictive decoding method, a predictive decoding device, and a predictive decoding program of motion vector.

BACKGROUND ART

Motion compensated prediction technology is occasionally used in video encoding and video decoding. In the motion compensation technology, a frame of a processing target in a video sequence is divided into a plurality of partitions. These partitions are sequentially selected as a partition of a processing target (target partition). A motion vector is then determined for the target partition. In the motion compensated prediction technology, a motion vector predictor is determined using motion vectors of neighboring partitions to the target partition and the motion vector of the target partition is predictively encoded or predictively decoded in some cases.

SUMMARY OF INVENTION

One aspect of a predictive coding system relates to a predictive encoding technology of motion vectors.

An embodiment of the predictive coding system may perform a predictive encoding method of motion vectors for predictively encoding a motion vector used in motion compensated prediction of a video sequence consisting of a temporal sequence of frame pictures. The method comprising: (a) a step of determining a motion vector of a target partition in a frame picture of an encoding target in the video sequence; (b) a step of determining a first motion vector predictor candidate satisfying one or more predetermined criterion used for determination of motion vector predictor candidates, from a motion vector or motion vectors of one or more partitions belonging to a left-neighboring region located on the left side of the target partition; (c) a step of determining a second motion vector predictor candidate satisfying one or more predetermined criterion used for determination of motion vector predictor candidates, from a motion vector or motion vectors of one or more partitions belonging to an above-neighboring region located above the target partition; (d) a step of selecting an optimum motion vector predictor and outputting motion vector predictor indication information to specify the selected optimum motion vector predictor, the optimum motion vector predictor selected based on comparison between one or more motion vector predictor candidates including the first motion vector predictor candidate and the second motion vector predictor candidate, and the motion vector of the target partition; and (e) a step of encoding the motion vector predictor indication information. As used herein, the terms "above", "below", "left", and "right" should be construed as describing a positional relationship between described objects or subject matter that is not limited to the directional meaning of these terms, and should not be construed as limiting orientation of the objects or subject matter with respect to any other reference.

The predictive coding system may also include a predictive encoding device of motion vectors, which is a device for predictively encoding a motion vector used in motion compensated prediction of a video sequence consisting of a temporal sequence of frame pictures. The predictive encoding device can include motion detection means which determines a motion vector of a target partition in a frame picture of an encoding target in the video sequence; first motion vector predictor candidate determination means which determines a first motion vector predictor candidate satisfying one or more predetermined criterion used for determination of motion vector predictor candidates from a motion vector, or motion vectors, of one or more partitions belonging to a left-neighboring region located on the left side of the target partition; second motion vector predictor candidate determination means which determines a second motion vector predictor candidate satisfying one or more predetermined criterion used for determination of motion vector predictor candidates from a motion vector, or motion vectors, of one or more partitions belonging to an above-neighboring region located above the target partition; motion vector predictor determination means, which selects an optimum motion vector predictor based on comparison between the motion vector of the target partition and one or more motion vector predictor candidates. The one or more motion vector predictor candidates including at least one of the first motion vector predictor candidate, or the second motion vector predictor candidate. The motion vector predictor determination means outputs motion vector predictor indication information to specify the optimum motion vector predictor selected; and encoding means which encodes the motion vector predictor indication information.

An embodiment of the predictive coding system includes a predictive encoding program of motion vectors stored in a non-transitory computer readable storage media, which is executable by a processor to predictively encode a motion vector used in motion compensated prediction of a video sequence consisting of a temporal sequence of frame pictures. The program stored in the computer readable storage media executable by a processor to function as at least part of: the motion detection means, the first motion vector predictor candidate determination means, the second motion vector predictor candidate determination means, the motion vector predictor determination means, and the encoding means described above.

In the predictive encoding technology of motion vectors described above, the motion vector predictor candidates are narrowed down, and thereafter the motion vector predictor is determined based on the comparison between the motion vector of the target partition and the motion vector predictor candidates. Therefore, the predictive coding system may reduce the computational complexity necessary for the determination of the motion vector predictor.

In an embodiment of the predictive coding system, the predictive encoding technology may be configured as follows: a predicted signal of a pixel signal of a target partition is generated by referring to a reference frame with a frame identifier, such as a number, specified by a reference picture list identification and a reference picture identification; a first motion vector predictor candidate is determined from motion vectors of partitions in a left-neighboring region having a reference picture list identification and/or a reference picture identification coincident with the reference picture list identification and/or the reference picture identification for the target partition; the second motion vector predictor candidate is determined from motion vectors of partitions in an above-neighboring region having a reference picture list identification and/or a reference picture identification coincident with the reference picture list identification and/or the reference picture identification for the target partition.

In an embodiment of the predictive coding system, the motion vector predictor indication information may be encoded into encoded data of a bit count according to the number of motion vector predictor candidates. For example, the motion vector predictor indication information may be encoded into encoded data of a minimum bit count according to the number of motion vector predictor candidates. This embodiment may reduce the bit count of encoded data of the motion vector predictor indication information.

In an embodiment of the predictive coding system, a left-neighboring region may include a neighboring partition located below and on the left side of a target partition. The below-left-neighboring partition is a partition including neighboring pixels existing below and on the left side of a bottom left pixel in the target partition. In this embodiment, the below-left-neighboring partition is included in the left-neighboring region, and the motion vector of the below-left-neighboring partition is not defined as an independent motion vector predictor candidate when the first motion vector predictor candidate is determined from the left-neighboring region. This embodiment may reduce the number of motion vector predictor candidates. As a result, a bit count of encoded data of the motion vector predictor indication information may be reduced.

In an embodiment of the predictive coding system, an above-neighboring region may include a neighboring partition located above and on the right side of a target partition. The above-right-neighboring partition is a partition that includes neighboring pixels existing above and on the right side of a top right pixel in the target partition. In this embodiment, the above-right-neighboring partition is included in the above-neighboring region, and a motion vector of the above-right-neighboring partition is not defined as an independent motion vector predictor candidate when the second motion vector predictor candidate is determined from the above-neighboring region. This embodiment may reduce the number of motion vector predictor candidates. As a result, a bit count of encoded data of the motion vector predictor indication information may be reduced.

In an embodiment of the predictive coding system, either a left-neighboring region or an above-neighboring region may include a neighboring partition located above and on the left side of a target partition. The above-left-neighboring partition is a partition that includes neighboring pixels existing above and on the left side of a top left pixel in the target partition. In this embodiment, a motion vector of the above-left-neighboring partition is not defined as an independent motion vector predictor candidate, and a motion vector predictor candidate is determined while the above-left-neighboring partition is included in the left-neighboring region or in the above-neighboring region. This embodiment may reduce the number of motion vector predictor candidates. As a result, a bit count of encoded data of the motion vector predictor indication information may be reduced.

In an embodiment of the predictive coding system, a predictive encoding technology may be configured as follows: one or more partitions in a left-neighboring region are scanned in an upward direction from a bottom of the left-neighboring region, whereby a motion vector satisfying one or more predetermined criterion is determined as the first motion vector predictor candidate from motion vectors of the one or more partitions. The predetermined criterion can be used in determination of motion vector predictor candidates. A subsequent scan in the left-neighboring region may be terminated upon detection of the motion vector satisfying the predetermined criterion used in determination of motion vector predictor candidates. According to knowledge gained by the inventors based on research on a large number of video sequences, a partition, from among the partitions in the left-neighboring region, with a motion vector having a small difference from the motion vector of the target partition tends to exist on the lower side in the left-neighboring region. Therefore, the first motion vector predictor candidate with a small difference from the motion vector of the target partition can be efficiently determined by scanning the left-neighboring region in the foregoing scan order.

In an embodiment of the predictive coding system, the predictive encoding technology may be configured as follows: one or more partitions in an above-neighboring region are scanned in a leftward direction from right to left, whereby a motion vector satisfying one or more predetermined criterion used in determination of motion vector predictor candidates is determined as a second motion vector predictor candidate from motion vectors of the one or more partitions. The subsequent scan in the above-neighboring region may be terminated upon detection of the motion vector satisfying the predetermined criterion used in determination of motion vector predictor candidates. According to the knowledge gained by the inventors based on research on a large number of video sequences, a partition with a motion vector having a small difference from the motion vector of the target partition among the partitions in the above-neighboring region tends to exist on the right side in the above-neighboring region. Therefore, the second motion vector predictor candidate with a small difference from the motion vector of the target partition can be efficiently determined by scanning the above-neighboring region in the foregoing scan order.

In an embodiment of the predictive coding system, the predictive encoding technology may be configured as follows: it comprises determining first scan direction indication information indicative of a direction of scanning one or more partitions included in a left-neighboring region, in order to determine a first motion vector predictor candidate; determining second scan direction indication information indicative of a direction of scanning one or more partitions included in an above-neighboring region, in order to determine a second motion vector predictor candidate; and further encoding the first scan direction indication information and the second scan direction indication information. In this embodiment, the scans are carried out in both the upward and downward directions in the left-neighboring region to select a motion vector satisfying one or more predetermined criterion used in determination of motion vector predictor candidates. An optimum motion vector from among the motion vectors selected in the upward and downward directions is defined as the first motion vector predictor candidate, and information indicative of the direction of the scan in which the first motion vector predictor candidate is acquired is defined as the first scan direction indication information. Furthermore, the scans are carried out in both the leftward and rightward directions in the above-neighboring region to select the motion vector satisfying the one or more predetermined criterion used in determination of motion vector predictor candidates. The optimum motion vector, from among the motion vectors selected in the leftward and rightward directions, is defined as the second motion vector predictor candidate and information indicative of the direction of the scan in which the second motion vector predictor candidate is acquired is defined as the second scan direction indication information. This embodiment permits achievement of further improvement in encoding efficiency by determination of the first motion vector predictor candidate and the second motion vector predictor candidate.

In an embodiment of the predictive coding system, the number of one or more motion vector predictor candidates may be not more than a predetermined number, such as three. This embodiment may further reduce the bit count of encoded data of the motion vector predictor indication information.

In an embodiment of the predictive coding system, an optimum motion vector predictor may be used as a motion vector of a target partition, without encoding a residual signal between the motion vector of the target partition and the optimum motion vector predictor. This embodiment may further improve the encoding efficiency because the residual signal of the motion vector is not encoded.

Another aspect of the of the predictive coding system relates to a predictive decoding technology of motion vectors.

The predictive coding system may also perform a method for predictively decoding a motion vector used in motion compensated prediction to restore a video sequence consisting of a temporal sequence of frame pictures. The method comprising: (a) a step of determining a first motion vector predictor candidate that satisfies one or more predetermined criterion used in determination of motion vector predictor candidates. The first motion vector predictor candidate from a motion vector or motion vectors of one or more partitions included in a left-neighboring region located on the left side of a target partition in a frame picture of a decoding target; (b) a step of determining a second motion vector predictor candidate that satisfies one or more predetermined criterion used in determination of motion vector predictor candidate. The second motion vector predictor candidate determined from a motion vector or motion vectors of one or more partitions included in an above-neighboring region located above the target partition; (c) a step of decoding encoded data to restore motion vector predictor indication information specifying an optimum motion vector predictor for the target partition; and (d) a step of selecting the optimum motion vector predictor specified by the motion vector predictor indication information, from one or more motion vector predictor candidates, the one or more motion vector predictor candidates including at least the first motion vector predictor candidate and the second motion vector predictor candidate.

The predictive coding system may also include a device for predictively decoding a motion vector used in motion compensated prediction to restore a video sequence consisting of a temporal sequence of frame pictures. The device comprising: first motion vector predictor candidate determination means, which determines a first motion vector predictor candidate that satisfies one or more predetermined criterion used in determination of motion vector predictor candidates from a motion vector or motion vectors of one or more partitions belonging to a left-neighboring region located on the left side of a target partition in a frame picture of a decoding target; second motion vector predictor candidate determination means, which determines a second motion vector predictor candidate that satisfies one or more predetermined criterion used in determination of motion vector predictor candidates from a motion vector or motion vectors of one or more partitions belonging to an above-neighboring region located above the target partition; decoding means which decodes encoded data to restore motion vector predictor indication information to specify an optimum motion vector predictor for the target partition; and optimum motion vector predictor determination means which selects the optimum motion vector predictor specified by the motion vector predictor indication information. The optimum motion vector predictor can be selected from one or more motion vector predictor candidates including at least the first motion vector predictor candidate and the second motion vector predictor candidate.

An embodiment of the predictive coding system includes a program for predictively decoding a motion vector. The program is stored in a non-transitory computer readable storage media, and is executable by a processor to predictively decode a motion vector used in motion compensated prediction to restore a video sequence consisting of a temporal sequence of frame pictures. The program stored in the computer readable storage media is executable by a processor to function as at least part of: the first motion vector predictor candidate determination means, the second motion vector predictor candidate determination means, the decoding means, and the optimum motion vector predictor determination means described above.

In the predictive decoding technology of motion vectors described above, the motion vector predictor candidates are narrowed down and thereafter the motion vector predictor is determined based on the comparison between the motion vector of the target partition and the motion vector predictor candidates. Therefore, the predictive coding system may reduce the computational complexity necessary for the determination of the motion vector predictor.

In an embodiment of the predictive coding system, the predictive decoding technology may be configured as follows: a predicted signal of a picture signal of a target partition is generated by referring to a reference frame with a frame number specified by a reference picture list identification and a reference picture identification; a first motion vector predictor candidate is determined from motion vectors of partitions in the left-neighboring region having a reference picture list identification and/or a reference picture identification identical to the reference picture list identification and/or the reference picture identification for the target partition; a second motion vector predictor candidate is determined from motion vectors of partitions in the above-neighboring region having a reference picture list identification and/or a reference picture identification identical to the reference picture list identification and/or the reference picture identification for the target partition.

In an embodiment of the predictive coding system, a bit count of encoded data of motion vector predictor indication information may be a bit count according to the number of motion vector predictor candidates. For example, the bit count of encoded data of the motion vector predictor indication information may be a minimum bit count according to the number of motion vector predictor candidates. This embodiment may reduce the bit count of the encoded data of the motion vector predictor indication information.

In an embodiment of the predictive coding system, a left-neighboring region may include a neighboring partition located below and on the left side of a target partition. In this embodiment, a motion vector of the below-left-neighboring partition is not defined as an independent motion vector predictor candidate and the below-left-neighboring partition is included in the left-neighboring region; then a first motion vector predictor candidate is determined from the left-neighboring region. This embodiment may reduce the number of motion vector predictor candidates. As a result, it may reduce the bit count of encoded data of the motion vector predictor indication information and reduce the computational complexity of the decoding process to restore the motion vector predictor indication information from the encoded data.

In an embodiment of the predictive coding system, an above-neighboring region may include a neighboring partition located above and on the right side of a target partition. In this embodiment, a motion vector of the above-right-neighboring partition is not defined as an independent motion vector predictor candidate and the above-right-neighboring partition is included in the above-neighboring region; then a second motion vector predictor candidate is determined from the above-neighboring region. This embodiment may reduce the number of motion vector predictor candidates. As a result, it may reduce the bit count of encoded data of the motion vector predictor indication information and reduce the computational complexity of the decoding process to restore the motion vector predictor indication information from the encoded data.

In an embodiment of the predictive coding system, either a left-neighboring region or a above-neighboring region may include a neighboring partition located above and on the left side of a target partition. In this embodiment, a motion vector of the above-left-neighboring partition is not defined as an independent motion vector predictor candidate and the above-left-neighboring partition is included in the left-neighboring region or in the above-neighboring region; then the motion vector predictor candidate is determined therefrom. This embodiment may reduce the number of motion vector predictor candidates. As a result, the bit count of encoded data of the motion vector predictor indication information may be reduced, and the computational complexity of the decoding process to restore the motion vector predictor indication information from the encoded data may also be reduced.

In an embodiment of the predictive coding system, the predictive decoding technology may be configured as follows: one or more partitions in a left-neighboring region are scanned in an upward direction from a bottom of the left-neighboring region, whereby a motion vector satisfying a predetermined criterion used in determination of motion vector predictor candidates is determined as the first motion vector predictor candidate from motion vectors of the one or more partitions. A subsequent scan in the left-neighboring region may be terminated upon detection of the motion vector satisfying the predetermined criterion of determination of motion vector predictor candidates. The first motion vector predictor candidate with a small error from the motion vector of the target partition can be efficiently determined by scanning the left-neighboring region in the foregoing scan order.

In an embodiment of the predictive coding system, the predictive decoding technology may be configured as follows: one or more partitions in the above-neighboring region are scanned in a direction from right to left, whereby a motion vector satisfying the predetermined criterion used in determination of motion vector predictor candidates is determined as a second motion vector predictor candidate from motion vectors of the one or more partitions. The subsequent scan in the above-neighboring region may be terminated upon detection of the motion vector satisfying the predetermined criterion used in determination of motion vector predictor candidates. The second motion vector predictor candidate with a small error from the motion vector of the target partition can be efficiently determined by scanning the above-neighboring region in the foregoing scan order.

In an embodiment of the predictive coding system, the predictive decoding technology may be configured to include: decoding encoded data to restore first scan direction indication information to specify a direction of scanning of one or more partitions in a left-neighboring region and second scan direction indication information to specify a direction of scanning of one or more partitions in an above-neighboring region; scanning the one or more partitions in the left-neighboring region in the direction specified by the first scan direction indication information to determine the first motion vector predictor candidate; and scanning the one or more partitions in the above-neighboring region in the direction specified by the second scan direction indication information to determine the second motion vector predictor candidate. This embodiment may determine the first motion vector predictor candidate and the second motion vector predictor candidate with smaller errors from the motion vector of the target partition.

In an embodiment of the predictive coding system, the number of one or more motion vector predictor candidates may not be more than a predetermined number, such as three. This embodiment may further reduce the bit count of the motion vector predictor indication information.

In an embodiment of the predictive coding system, the optimum motion vector predictor may be used as a motion vector of a target partition. This embodiment may reduce a data volume of encoded data because a residual signal of the motion vector is not encoded.

As described above, the aspects and the embodiments of the predictive coding system provide the predictive encoding method, predictive encoding device, and predictive encoding program of motion vectors and the predictive decoding method, predictive decoding device, and predictive decoding program of motion vectors capable of reducing the computational complexity necessary for the determination of motion vector predictors.

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF DRAWINGS

The predictive coding system, may be better understood with reference to the following drawings and description. The components in the figures are not necessarily to scale, emphasis instead being placed upon illustrating the principles of the system. Moreover, in the figures, like referenced numerals designate corresponding parts throughout the different views.

DESCRIPTION OF EMBODIMENTS

Figure 1A:
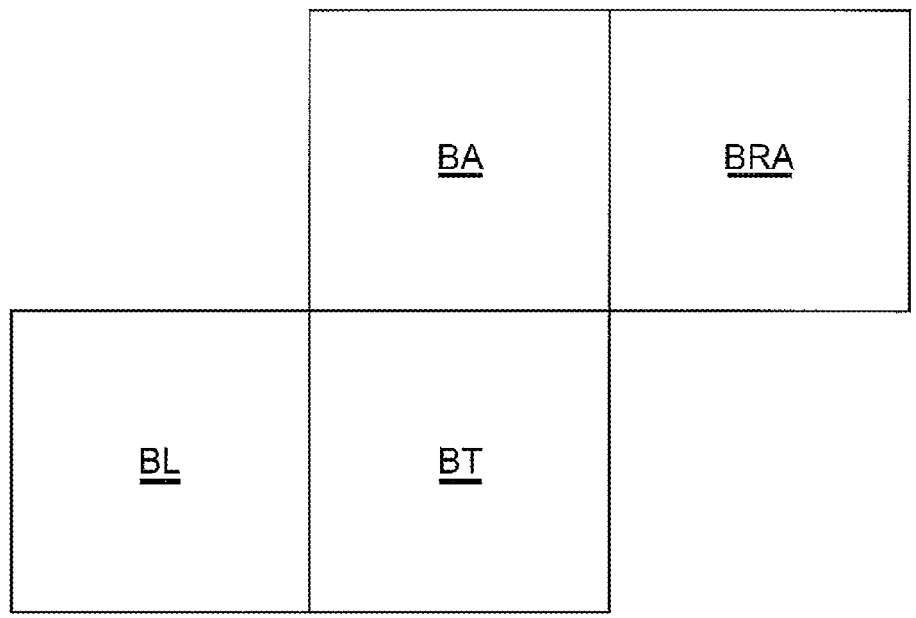
FIG. 1A is a drawing illustrating an example of rectangular neighboring partitions used in motion compensated prediction.
Figure 1B:
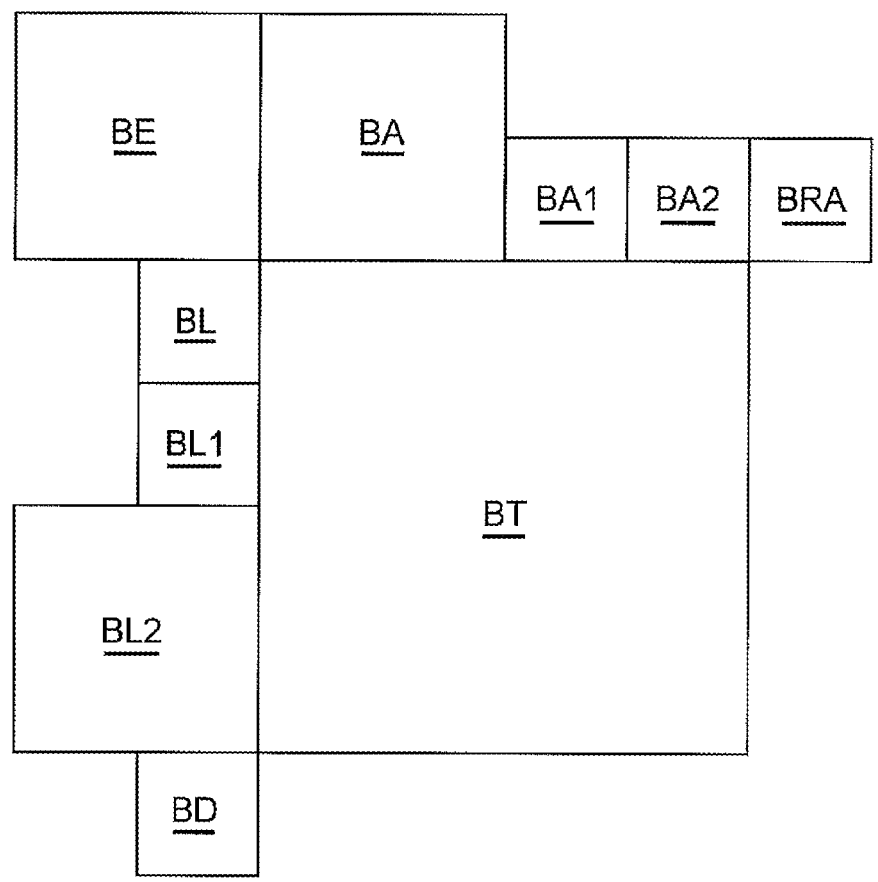
FIG. 1B is a drawing illustrating an example of rectangular neighboring partitions used in motion compensated prediction.

FIGS. 1A and 1B are drawings to illustrate an example of rectangular neighboring partitions used in the motion compensated prediction. In FIG. 1A, the shape of target partition BT is identical to the shape of neighboring partitions BL, BA, and BRA. The left-neighboring partition BL includes a neighboring pixel existing on the left side of the top left pixel in the target partition BT; the above-neighboring partition BA includes a neighboring pixel existing above the top left pixel in the target partition BT; the above-right-neighboring partition BRA includes a neighboring pixel existing above and on the right side of the top right pixel in the target partition BT. A motion vector predictor having median values of horizontal components and vertical components of motion vectors of the left-neighboring partition BL, the above-neighboring partition BA, and the above-right-neighboring partition BRA may be employed in some examples, such as in H.264/AVC.

On the other hand, FIG. 1B illustrates an example where there are a plurality of neighboring partitions having respective shapes different from the shape of the target partition BT. The plurality of neighboring partitions in FIG. 1B include neighboring partitions BL1, BL2, BA1, BA2, BD, and BE, in addition to the left-neighboring partition BL, the above-neighboring partition BA, and the above-right-neighboring partition BRA. The plurality of neighboring partitions may be scanned in a predetermined spatial order to specify a neighboring partition with the best spatial similarity to a pixel signal of the target partition, and a motion vector of the neighboring partition thus specified is used as a motion vector predictor, such as, for example, as described in PCT Application Laid-open No. 2010-515399. The spatial similarity to be used is the sum of absolute differences (SAD) between the pixel signal of the target partition and the pixel signal of the neighboring partition, which is, for example, similar to PCT Application Laid-open No. 2010-515399. In some examples, such as in PCT Application Laid-open No. 2010-515399 spatial similarity can be calculated while scanning the plurality of neighboring partitions in a predetermined order, which requires a considerable number of calculations for determination of the motion vector predictor. In the predictive coding system, on the other hand, computational complexity, and correspondingly the number of calculations are reduced.

Figure 2:
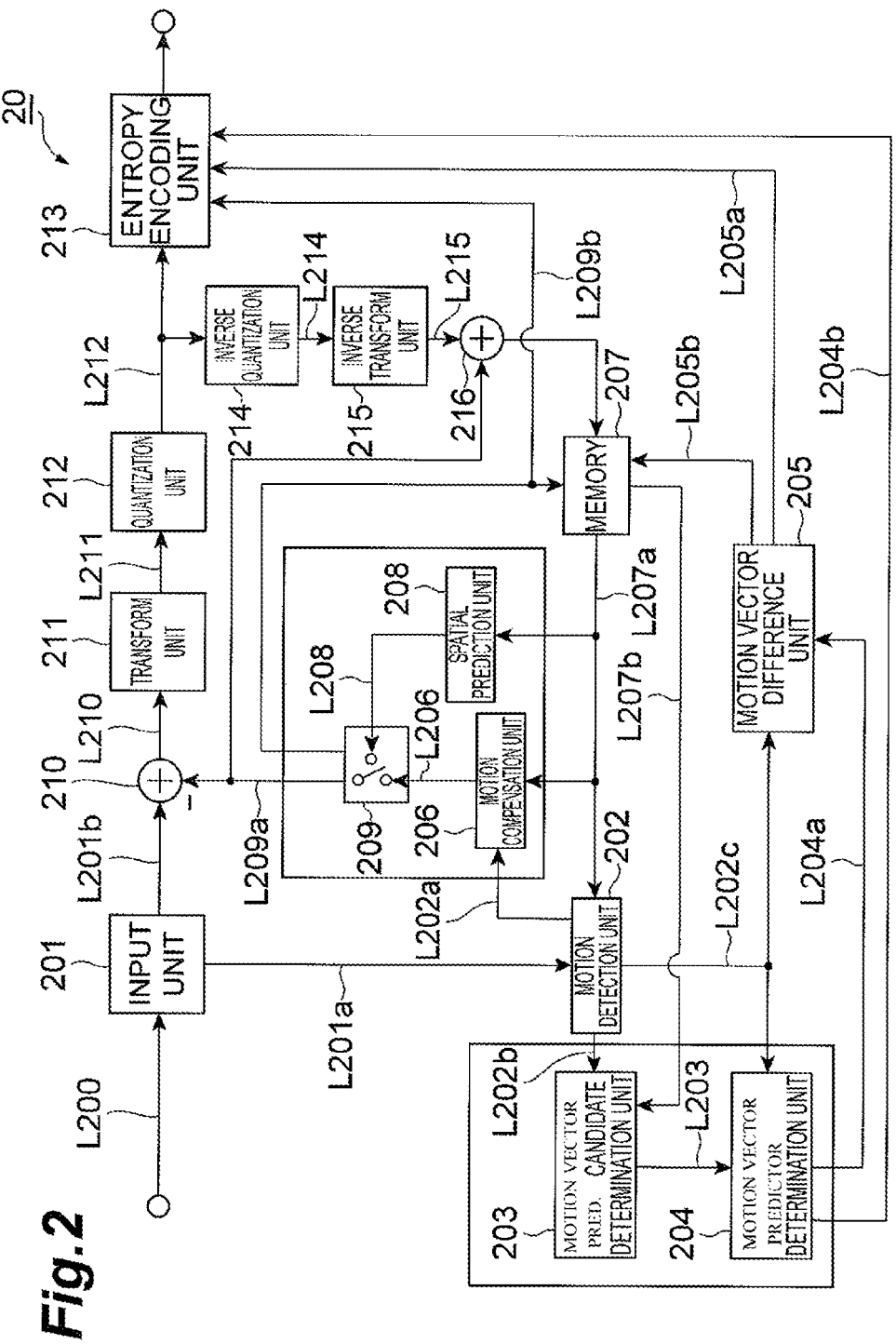
FIG. 2 is a drawing showing an example configuration of a video encoding device according to an embodiment.

FIG. 2 is a drawing showing an example configuration of a video encoding device according one embodiment of the predictive coding system. The video encoding device 20 shown in FIG. 2 is an example of a device that predictively encodes a motion vector and may be a computing device or computer, including for example software, hardware, or a combination of hardware and software, as described later, capable of performing the described functionality. The video encoding device 20 may be one or more separate systems or devices included in the predictive coding system, or may be combined with other systems or devices within the predictive coding system. In other examples, fewer or additional blocks may be used to illustrate the functionality of the video encoding device 20.

A video sequence input into the video encoding device 20 is composed of a temporal sequence of frame pictures. A frame picture signal targeted for encoding will be referred to hereinafter as "current frame." In the video encoding device 20, a current frame is divided into rectangular partitions of variable size and the processing described below is carried out in each of partition units.

The video encoding device 20 can use any one of an inter-frame prediction mode and a plurality of intra-frame prediction modes, switching the prediction mode for each partition within the current frame. For example, the video encoding device 20 selects a prediction mode with a high, or optimized, encoding efficiency among the inter-frame prediction mode and the intra-frame prediction modes, for each partition. The "inter-frame prediction mode" as discussed herein is a mode in which a motion vector is detected with reference to a plurality of previously-encoded frame picture signals (reference frame picture signals) that are different in time from a frame picture signal, in order to perform motion-compensated inter-frame prediction.

The "intra-frame prediction mode" as discussed herein is a mode in which spatial prediction is carried out using pixel values of neighborhood regions previously encoded on the same frame.

In the "inter-frame prediction mode," respective processes of motion detection, motion prediction, and motion compensation are carried out for each of sub-partitions, for example, obtained by further dividing a partition of N×N pixels in an optional size (such as (N/2) pixels×N lines or (N/4) pixels×(N/4) lines).

As shown in the example of FIG. 2, the video encoding device 20 can be provided with an input unit 201, a motion detection unit 202, a motion vector predictor candidate determination unit 203, a motion vector predictor determination unit 204, a motion vector difference unit 205, a motion compensation unit 206, a memory 207, a spatial prediction unit 208, a prediction method determination unit 209, a subtraction unit 210, a transform unit 211, a quantization unit 212, an entropy encoding unit 213, an inverse quantization unit 214, an inverse transform unit 215, and an addition unit 216. Each "unit" described herein, is hardware, or a combination of hardware and software. For example, each unit may include and/or initiate execution of an application specific integrated circuit (ASIC), a Field Programmable Gate Array (FPGA), a circuit, a digital logic circuit, an analog circuit, a combination of discrete circuits, gates, or any other type of hardware, or combination thereof. Accordingly, as used herein, execution of a "unit" by a processor can also refer to logic based processing by the unit that is initiated directly or indirectly by a processor to complete a process or obtain a result. Alternatively or in addition, each "unit" can include memory hardware, such as at least a portion of a memory, for example, that includes instructions executable with a processor to implement one or more of the features of the unit. When any one of the units includes instructions stored in memory and executable with the processor, the unit may or may not include the processor. In some examples, each unit may include only memory storing instructions executable with a processor to implement the features of the corresponding unit without the unit including any other hardware. Because each unit includes at least some hardware, even when the hardware includes software, each unit may be interchangeably referred to as a hardware unit, such as the input hardware unit 201, or the motion detection hardware unit 202, for example.

The input unit 201 receives an input video signal as a video signal input from the outside and decomposes the video signal into frame picture signals. The input unit 201 outputs each frame picture signal through line L201a and through line L201b to the subtraction unit 210 and to the motion detection unit 202.

The memory 207 is a part that stores frame picture signals having been encoded in the past, information (motion vectors, reference picture list identifications, reference picture identifications) and other data used in the prediction thereof.

The motion detection unit 202 performs detection of motion vector. More specifically, the motion detection unit 202 searches a reference frame picture signal input via line L207a from the memory 207, for a picture signal pattern similar to a picture signal pattern of a target partition in the current frame input via line L201a. The motion detection unit 202 searches in a predetermined search range in the reference frame. The motion detection unit 202 detects a motion vector representing a spatial displacement quantity between the target partition and the picture signal pattern obtained by the search, and a reference picture list identification and a reference picture identification for specifying a frame number of the reference frame used. The detected motion vector, reference picture list identification, and reference picture identification are output via line L202a to the motion compensation unit 206 and via line L202c to the motion vector difference unit 205. Furthermore, the motion detection unit 202 outputs the detected reference picture list identification and reference picture identification via line L202b to the motion vector predictor candidate determination unit 203. In the video encoding device 20, frame numbers to specify respective reference frame picture signals can be managed in the form of lists. A frame number is specified using a reference picture list identification (Reference Picture List) to specify a list, and, a reference picture identification (Reference Index) as an index of the frame number in the list. This technology is well-known technology in H.264/AVC and others.

The motion vector predictor candidate determination unit 203 determines motion vector predictor candidates using motion vectors of previously-encoded neighboring partitions input via line L207b. The details about the determination of motion vector predictor candidates will be described later. The motion vector predictor candidate determination unit 203 outputs the determined motion vector predictor candidates via line L203 to the motion vector predictor determination unit 204.

The motion vector predictor determination unit 204 determines an optimum motion vector predictor (motion vector predictor values) from the motion vector predictor candidates input via line L203. More specifically, the motion vector predictor determination unit 204 determines a motion vector predictor candidate with the smallest difference from the motion vector of the target partition input via line L202c, as an optimum motion vector predictor MVPopt, out of the motion vector predictor candidates. The determined optimum motion vector predictor MVPopt is fed via line L204a to the motion vector difference unit 205. Furthermore, the number of motion vector predictor candidates and motion vector predictor indication information to specify the optimum motion vector predictor MVPopt out of the motion vector predictor candidates are fed via line L204b to the entropy encoding unit 213.

In the present embodiment the motion vector predictor candidate with the smallest difference from the motion vector of the target partition is selected as the optimum motion vector predictor MVPopt. Alternatively the motion vector predictor determination unit 204 may select as the optimum motion vector predictor MVPopt a motion vector predictor candidate with the smallest number of bits assigned to a calculated motion vector difference.

In the present embodiment the optimum motion vector predictor is determined after the motion detection of the target partition. Alternatively, the optimum motion vector predictor may be detected before the motion detection. Specifically, as indicated by the formula (1) below, the optimum motion vector predictor may be calculated based on the sum of absolute differences (SADpmv) between the predicted picture signal in execution of the motion compensation using each of the actually-calculated motion vector predictor candidates, and the target picture signal and a cost function using the bit count (Rpmv) in encoding of the motion vector predictor candidate and λ as a weight for the bit count. In this case, the picture signal of the target partition is input through line L201a and each reference frame picture signal is input through line L207a to the motion vector predictor determination unit 204 in FIG. 2.

$$\text{Cost}_{pmv}SAD_{pmv}+\lambda R_{pmv} \quad (1)$$

The motion vector difference unit 205 calculates motion vector difference values which are difference information between the motion vector input via line L202c and the optimum motion vector predictor input via line L204a. The motion vector difference unit 205 transmits a signal including the calculated motion vector difference values, and the reference picture list identification and reference picture identification, as prediction information via line L205a to the entropy encoding unit 213. Furthermore, the motion vector difference unit 205 transmits a signal including the motion vector, and the reference picture list identification and reference picture identification, via line L205b to the memory 207.

The motion compensation unit 206 generates a predicted picture signal of the target partition, referring to the reference frame picture signal of the frame number specified by the reference picture list identification and the reference picture identification received from the motion detection unit 202 and using the motion vector received from the motion detection unit 202. This predicted picture signal is output to the prediction method determination unit 209.

The spatial prediction unit 208 generates a predicted picture signal, referring to picture signals (reference frame picture signals) of previously-encoded neighboring regions input via line L207a. The spatial prediction unit 208 outputs the generated predicted picture signal to the prediction method determination unit 209.

The prediction method determination unit 209 compares the predicted picture signals received from the motion compensation unit 206 and the spatial prediction unit 208, to select either one of the predicted picture signals, and outputs the selected predicted picture signal to the subtraction unit 210. The prediction method determination unit 209 outputs prediction mode information indicative of a prediction method used for the generation of the selected predicted picture signal, via line L209b to the entropy encoding unit 213.

The subtraction unit 210 generates a difference value (prediction residual signal) between the frame picture signal input via line L201b and the predicted picture signal input via line L209a and outputs the prediction residual signal to the transform unit 211.

The transform unit 211 performs a transform, such as an orthogonal transform, of the prediction residual signal input via line L210, to generate transform coefficients, such as orthogonal transform coefficients, and outputs the orthogonal transform coefficients to the quantization unit 212. The quantization unit 212 quantizes the orthogonal transform coefficients input via line L211, to generate quantized orthogonal transform coefficients, and transmits the quantized orthogonal transform coefficients to the entropy encoding unit 213 and the inverse quantization unit 212.

The entropy encoding unit 213 performs entropy encoding of the quantized orthogonal transform coefficients input via line L212, the prediction mode information received from the prediction method determination unit 209, the prediction information transmitted from the motion vector difference unit 205, and the motion vector predictor indication information output from the motion vector predictor determination unit 204, multiplexes generated encoded data into a compressed stream, and transmits the compressed stream to the outside.

The inverse quantization unit 214 performs inverse quantization of the quantized orthogonal transform coefficients input via line L212, to generate orthogonal transform coefficients, and transmits the orthogonal transform coefficients to the inverse orthogonal transform unit 215. Then the inverse orthogonal transform unit 215 applies an inverse orthogonal transform to the orthogonal transform coefficients input via line L214, to generate a prediction residual signal, and transmits the prediction residual signal to the addition unit 216.

The addition unit 216 performs addition of the prediction residual signal input via line L215 and the predicted picture signal input via line L209a, to generate a frame picture signal, and transmits the frame picture signal to the memory 207. This frame picture signal is stored in the memory 207 and is used as a reference frame picture signal in the subsequent encoding process. In the memory 207, the motion vector, the reference picture list identification, the reference picture identification, etc. input via line L205b are also stored in association with the reference frame picture signal.

Next, one embodiment of a predictive encoding method of motion vector applicable in the video encoding device 20 will be described below.

First, partitions adjacent to a target partition will be described with reference to FIG. 1B. Partitions BL, BL1, and BL2 are partitions in contact with a left boundary of the target partition BT. Partition BD is a partition including neighboring pixels existing below and on the left side of the bottom left pixel in the target region BT. Partition BE is a partition including neighboring pixels existing above and on the left side of the top left pixel in the target partition BT. Partitions BA, BA1, and BA2 are partitions in contact with an upper boundary of the target partition BT. Partition BRA is a partition including neighboring pixels existing above and on the right side of the top right pixel in the target partition BT. The partitions neighboring the target partition may be partitions of the same size as the target partition BT, as shown in FIG. 1A.

Figure 3:
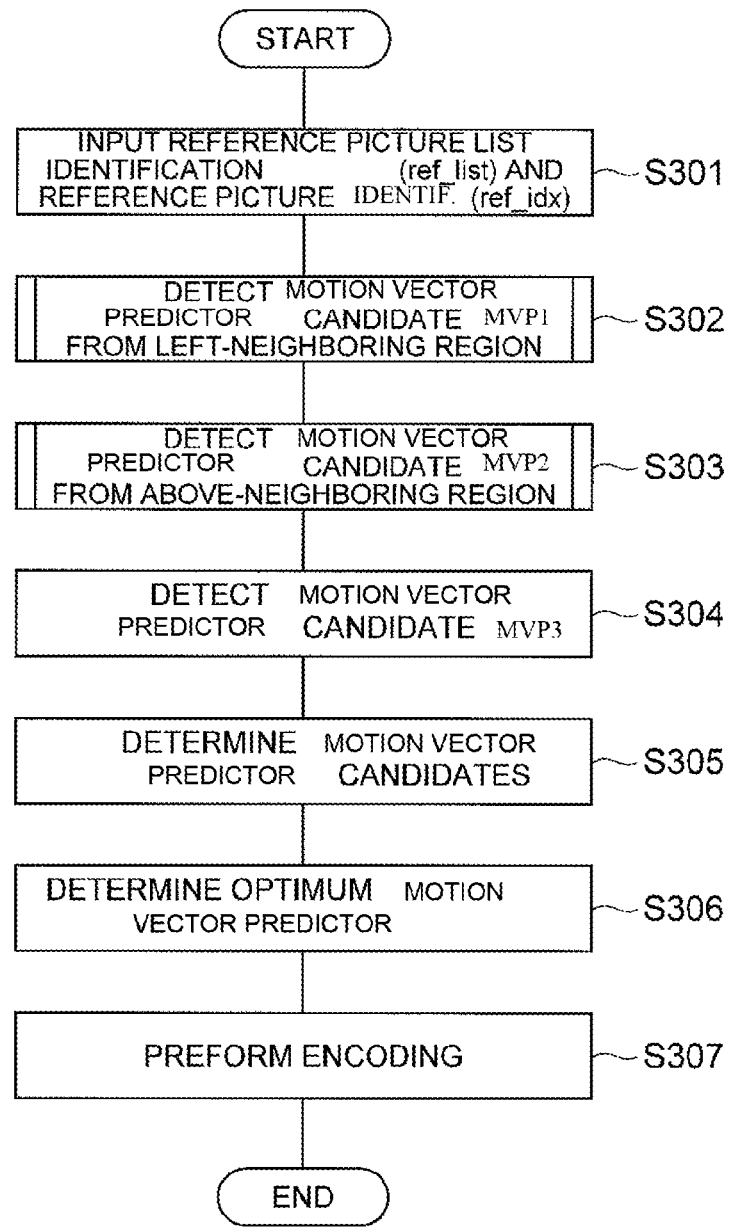
FIG. 3 is a flowchart showing an embodiment of an example of predictive encoding method of motion vectors.

Next, reference is made to the example of FIG. 3. FIG. 3 is a flowchart showing one embodiment of the predictive encoding method of motion vector performed by the predictive coding system. As shown in FIG. 3, in the predictive encoding method of motion vector according to the embodiment, first, the reference picture list identification and reference picture identification are input into the motion vector predictor candidate determination unit 203 (step S301).

Next, the motion vector predictor candidate determination unit 203 determines a motion vector predictor candidate MVP1 from a motion vector or motion vectors of one or more partitions included in the left-neighboring region located to the left of the target partition BT (step S302). The details about the determination method of the motion vector predictor candidate MVP1 will be described later.

Next, the motion vector predictor candidate determination unit 203 determines a motion vector predictor candidate MVP2 from a motion vector or motion vectors of one or more partitions included in the above-neighboring region located above the target partition BT (step S303). The details about the determination method of the motion vector predictor candidate MVP2 will be described later.

Next, the motion vector predictor candidate determination unit 203 determines a motion vector predictor candidate MVP3 (step S304). In the present embodiment, a motion vector of a partition existing in the reference frame and at a position substantially spatially identical to the target partition is determined as the motion vector predictor candidate MVP3.

The motion vector predictor candidate MVP3 may be a motion vector of another partition spatially adjacent to the target partition, instead of the motion vector of the partition at the same position as the target partition in the reference frame. It is also possible to use average values or the like calculated based on the motion vector predictor candidate MVP1 and the motion vector predictor candidate MVP2, as the motion vector predictor candidate MVP3.

The number of motion vector predictor candidates may be three or more. In this case, a plurality of motion vector predictor candidates may be determined by different methods from each of the left-neighboring region and the above-neighboring region. More specifically, a plurality of motion vector predictor candidates may be determined by searching partitions of each of the regions in a plurality of different scan directions, in each of the left-neighboring region and the above-neighboring region. It is also possible to use a motion vector of another neighboring region as a motion vector predictor candidate.

Referring back to FIG. 3, the motion vector predictor candidate determination unit 203 then determines only non-identical motion vector predictor candidates from among the motion vector predictor candidate MVP1, the motion vector predictor candidate MVP2, and the motion vector predictor candidate MVP3, as final motion vector predictor candidates (step S305). As a specific example, where the motion vector predictor candidate MVP1 is identical to the motion vector predictor candidate MVP3, only MVP1 and MVP2 are selected as motion vector predictor candidates. If there is no motion vector predictor candidates determined to satisfy the conditions in steps S302 to S304, a zero motion vector is defined as a motion vector predictor candidate.

Then the motion vector predictor determination unit 204 determines the optimum motion vector predictor, as described above, out of the motion vector predictor candidates determined by the motion vector predictor candidate determination unit 203 (step S306).

Then the encoding unit 213 encodes the motion vector predictor indication information to specify which motion vector predictor candidate is the optimum motion vector predictor (step S307).

In one embodiment, the motion vector predictor indication information can be encoded into encoded data of a bit count according to the number of motion vector predictor candidates selected by the motion vector predictor determination unit 204. For example, when the number of motion vector predictor candidates is a first predetermined number, such as 0 or 1, the motion vector predictor indication information is neither encoded nor transmitted. When the number of motion vector predictor candidates is a second predetermined number, such as 2 or 3, the motion vector predictor indication information is encoded in two bits at most.

The motion vector predictor indication information may be encoded based on an encoding table, such as a fixed encoding table irrespective of the number of motion vector predictor candidates. In this case, the motion vector predictor indication information may be encoded using an example encoding table below.

TABLE 1

| Encoding Table | |
| --- | --- |
| Bit value | Optimum motion vector predictor |
| 0 | motion vector predictor candidate 1 (MVP1) |
| 10 | motion vector predictor candidate 2 (MVP2) |
| 11 | motion vector predictor candidate 3 (MVP3) |

In one embodiment, the order in which the motion vector predictor candidate MVP1, the motion vector predictor candidate MVP2, and the motion vector predictor candidate MVP3 are determined may be changed. For example, a process may be used in which the target partition is divided into a plurality of sub-partitions and the encoding process is carried out for each of the sub-partitions. Specifically, when the target partition is divided into upper and lower sub-partitions, and the lower sub-partition can be used as a target partition, or when the target partition is divided into left and right sub-partitions, and the left sub-partition can be used as a target partition,—the motion vector predictor candidates can be determined in an order of the left-neighboring region, the above-neighboring region, and another region (such as a partition in a reference frame at the same position as the target partition). On the other hand, when the target partition is divided into upper and lower sub-partitions, and the upper sub-partition can be used as a target partition, or the target partition is divided into left and right sub-partitions, and the right sub-partition can be used as a target partition, the motion vector predictor candidates can be determined in an order of the above-neighboring region, the left-neighboring region, and another region (such as a partition in a reference frame at the same position as the target partition), for these target partitions.

A first embodiment of the determination process of motion vector predictor candidate according to one embodiment will be described below in detail. First, the first embodiment of the process of step S302 in FIG. 3 will be described with reference to the examples of FIGS. 1B, 4, and 5. It is assumed herein, as shown in FIG. 1B, that the left-neighboring region is composed of the below-left-neighboring partition BD to the target partition and the left-neighboring partitions BL, BL1, and BL2 to the target partition. It is also assumed that the partitions in the left-neighboring region are scanned in increasing order of index i shown in (a) of FIG. 4. Namely, the partitions in the left-neighboring region are assumed to be scanned in order from bottom to top.

The below-left-neighboring partition BD may be excluded from the left-neighboring region. Furthermore, a partition further below the below left-neighboring partition BD may be included in the left-neighboring region. Furthermore, the partition BE or a partition located above the partition BE may be included in the left-neighboring region. Furthermore, a partition located on the left side of the target partition and at a predetermined distance from the target partition may be included in the left-neighboring region.

Referring back to (a) of FIG. 4 and FIG. 5, in the process of step S302, first, the motion vector predictor candidate determination unit 203 sets 0 in index i (step S501). The motion vector predictor candidate determination unit 203 increases the index i by an increment of 1 in the subsequent step S502.

Next, the motion vector predictor candidate determination unit 203 determines whether there is the i-th partition in the scan order in the left-neighboring region and whether the partition has a motion vector (step S503). If there is the i-th partition in the left-neighboring region and if the partition has a motion vector, the motion vector predictor candidate determination unit 203 determines, in the subsequent step S504, whether the i-th partition and the target partition have the same reference picture list identification and reference picture identification. When the determination condition in step S504 is satisfied, the motion vector predictor candidate determination unit 203 determines the motion vector of the i-th partition as motion vector predictor candidate MVP1 in the subsequent step S505 and then outputs the motion vector predictor candidate MVP1 in the subsequent step S506, followed by termination of processing.

On the other hand, when the determination condition in step S503 is not satisfied or when the determination condition in step S504 is not satisfied, the processing transfers to step S507. In step S507, the motion vector predictor candidate determination unit 203 determines whether the index i is over the number N of partitions in the left-neighboring region. When the determination condition in step S507 is not satisfied, the motion vector predictor candidate determination unit 203 carries on the processing from step S502. On the other hand, when the determination condition in step S507 is satisfied, the motion vector predictor candidate determination unit 203 terminates the processing.

Figure 4:
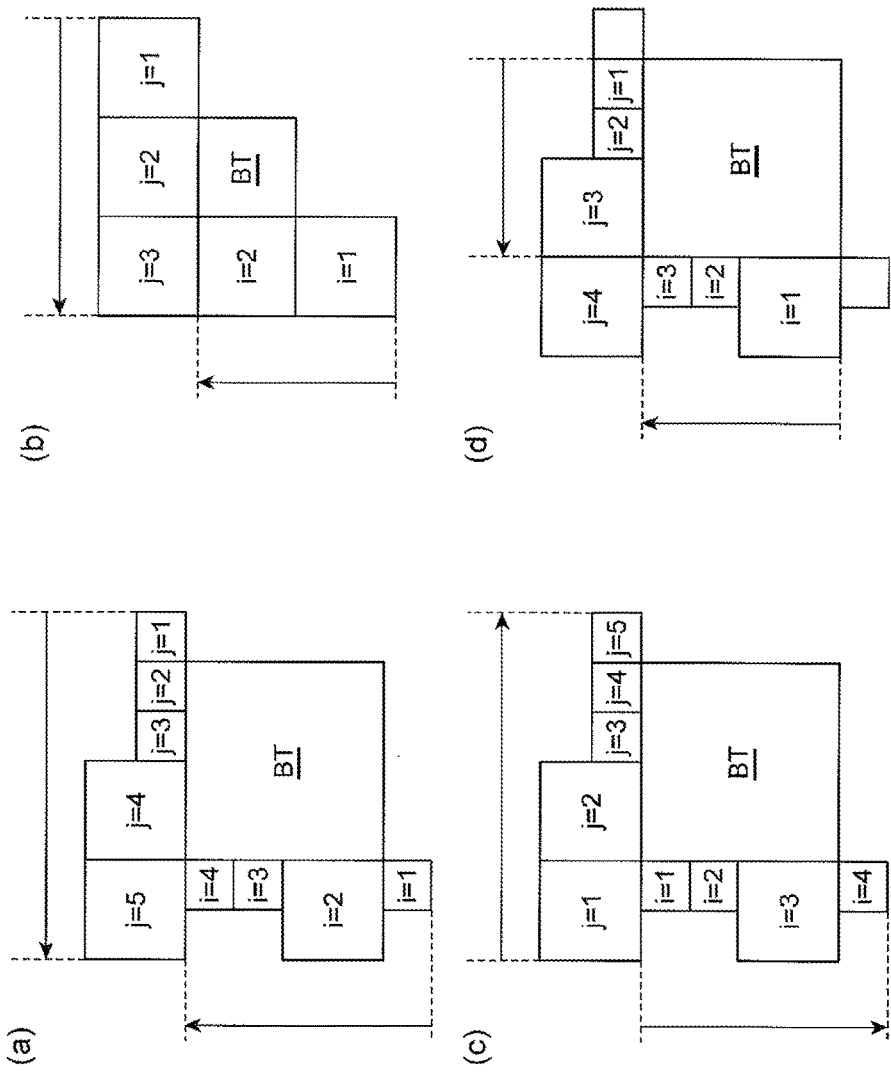
FIG. 4 is a drawing illustrating an example of rectangular neighboring partitions used in motion compensated prediction.
Figure 5:
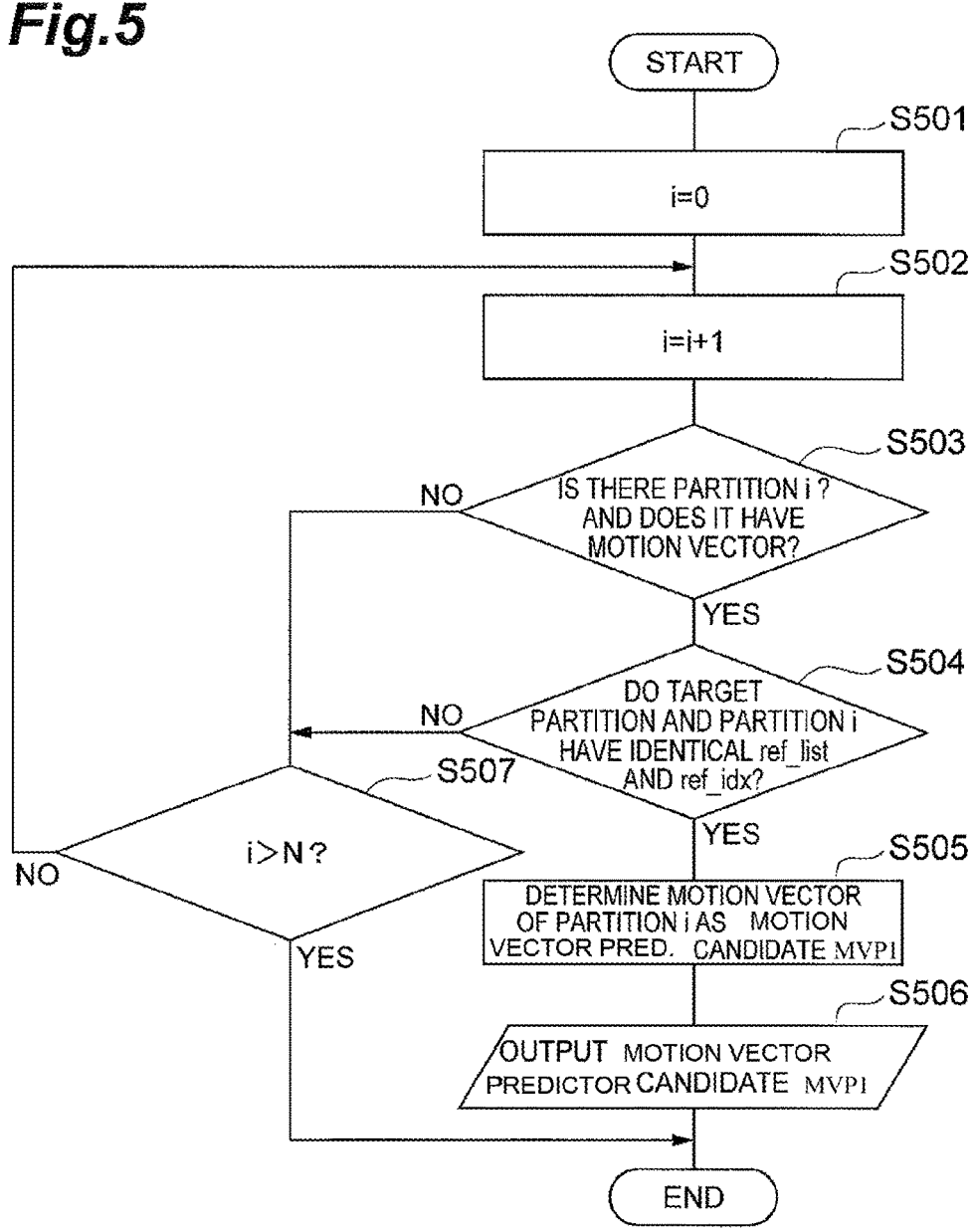
FIG. 5 is a flowchart showing a first embodiment of an example process of step S302 in FIG. 3.

The partitions in the left-neighboring region are scanned in order from the bottom of the left-neighboring region in the embodiment shown in (a) of FIG. 4, but in one embodiment, as shown in (c) of FIG. 4, they may be scanned in order from the top of the left-neighboring region.

In another embodiment, either of the scan order shown in (a) of FIG. 4 and the scan order shown in (c) of FIG. 4 may be adaptively selected. For example, the scan order may be determined based on a relation of motion vectors of neighboring partitions. Specifically, it is possible to adopt a method of comparing an absolute difference α between the motion vector of the partition BL and the motion vector of the partition BA with an absolute difference β between the motion vector of the partition BRA and the motion vector of the partition BD in FIG. 1B, and selecting the scan order in (c) of FIG. 4 if the absolute difference α is smaller than the absolute difference β. In the opposite case, on the other hand, the scan order in (a) of FIG. 4 may be selected.

In an embodiment, step S502 may be configured to increase the index i by an increment of two or more, thereby decimating the partitions to be scanned.

Figure 6:
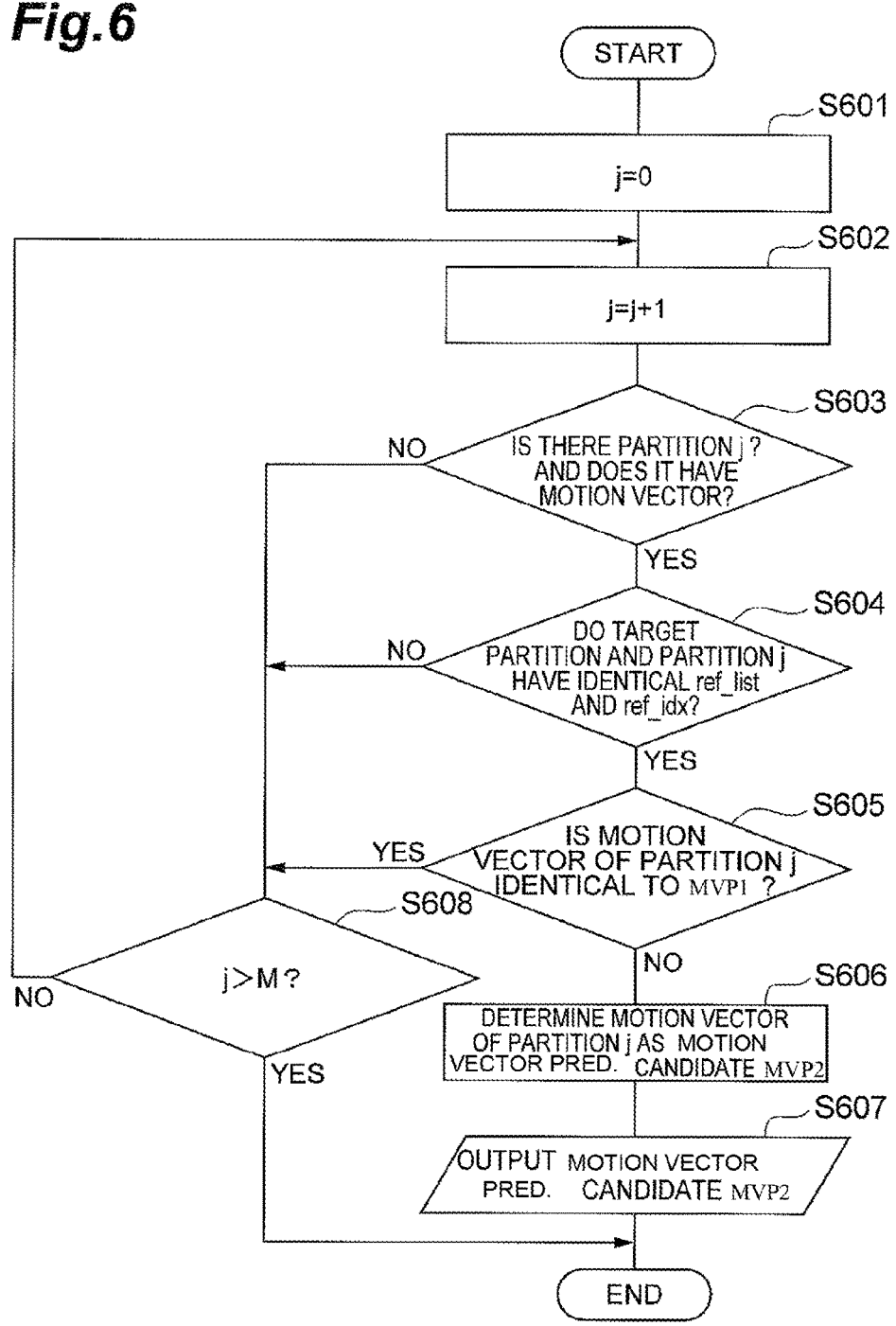
FIG. 6 is a flowchart showing a first embodiment of an example process of step S303 in FIG. 3.

The first embodiment of the process of step S303 in FIG. 3 will be described below in detail with reference to the examples of FIGS. 1B, 4, and 6. It is assumed herein, as shown in FIG. 1B, that the above-neighboring region is composed of the above-left-neighboring partition BE to the target partition and the above-neighboring partition BA, BA1, and BA2 to the target partition. It is also assumed that the partitions in the above-neighboring region are scanned in increasing order of index j shown in (a) of FIG. 4. Namely, the partitions in the above-neighboring region are assumed to be scanned in order from right to left.

The above-left-neighboring partition BE may be excluded from the above-neighboring region. Furthermore, a partition further left to the above-left-neighboring partition BE may be included in the above-neighboring region. Furthermore, a partition located above the target partition and at a predetermined distance from the target partition may be included in the above-neighboring region.

Referring back to (a) of FIG. 4 and FIG. 6, in the process of step S303, first, the motion vector predictor candidate determination unit 203 sets 0 in the index j (step S601). The motion vector predictor candidate determination unit 203 increases the index j by an increment of 1 in the subsequent step S602.

Next, the motion vector predictor candidate determination unit 203 determines whether there is the j-th partition in the scan order in the above-neighboring region and whether the partition has a motion vector (step S603). When there is the j-th partition in the above-neighboring region and when the partition has a motion vector, the motion vector predictor candidate determination unit 203 determines, in the subsequent step S604, whether the j-th partition and the target partition have the same reference picture list identification and reference picture identification. When the determination condition in step S604 is satisfied, the motion vector predictor candidate determination unit 203 determines, in the subsequent step S605, whether the motion vector of the j-th partition is identical to the motion vector predictor candidate MVP1. When the motion vector of the j-th partition is different from the motion vector predictor candidate MVP1, the motion vector predictor candidate determination unit 203 determines in the subsequent step S606 that the motion vector of the j-th partition is the motion vector predictor candidate MVP2, and then outputs the motion vector predictor candidate MVP2 in the subsequent step S607, followed by termination of processing.

On the other hand, when the determination condition in step S603 is not satisfied, when the determination condition in step S604 is not satisfied, or when the determination condition in step S605 is satisfied, the processing transfers to step S608.

In step S608, the motion vector predictor candidate determination unit 203 determines whether the index j is over the number M of partitions in the above-neighboring region. When the determination condition in step S608 is not satisfied, the motion vector predictor candidate determination unit 203 carries on the processing from step S602. On the other hand, when the determination condition in step S608 is satisfied, the motion vector predictor candidate determination unit 203 terminates the processing.

The partitions in the above-neighboring region are scanned in order from right to left in the embodiment shown in (a) of FIG. 4, but the partitions may be scanned in order from left to right, as shown in (c) of FIG. 4, in one embodiment.

In another embodiment, either of the scan order shown in the example (a) of FIG. 4 or the scan order shown in the example (c) of FIG. 4 may be adaptively selected. For example, the scan order may be determined based on a relation of motion vectors of neighboring partitions. Specifically, it is possible to adopt a method of comparing an absolute difference α between the motion vector of the partition BL and the motion vector of the partition BA with an absolute difference β between the motion vector of the partition BRA and the motion vector of the partition BD in FIG. 1B, and selecting the scan order in (c) of FIG. 4 if the absolute difference α is smaller than the absolute difference β. In the opposite case, on the other hand, the scan order in (a) of FIG. 4 may be selected.

The partition BE is included in the above-neighboring region in the above-described embodiment, but the partition BE may be included in the left-neighboring region. It is also possible to define the partition BE as a region independent of the above-neighboring region and the left-neighboring region, and treat the motion vector of the partition BE as another motion vector predictor candidate.

The foregoing embodiment employs both of the reference picture list identification and the reference picture identification as a determination condition for selecting the motion vector of the partition in the neighboring region as a motion vector predictor candidate, but the predictive coding system is not limited to this. For example, either of the reference picture list identification or the reference picture identification may be used for the determination condition. When the reference picture identification is not used, scaling of motion vectors of partitions in the neighboring region may be implemented according to a distance between the reference frame and the target frame. It is also possible to use information of another intra-frame prediction. Specifically, the size of the target partition and the sizes of the neighboring partitions may be added as one in the aforementioned determination condition. Specifically, when the size of the target partition is N×N pixels, a determination condition may be that the size of a partition in the neighboring region is N×N pixels, or a determination condition may be that the size of a partition is from N/2×N/2 pixels to 2N×2N pixels.

In the foregoing embodiment the calculation of the motion vector predictor candidate MVP2 in the above-neighboring region is performed after the calculation of the motion vector predictor candidate MVP1 in the left-neighboring region, but the predictive coding system is not limited to this. The motion vector predictor candidate MVP2 in the above-neighboring region may be determined prior to the determination of the motion vector predictor candidate MVP1 in the left-neighboring region. In this case, a process of determining whether a motion vector of a partition in the left-neighboring region is identical to the motion vector predictor candidate MVP2 in the above-neighboring region can be carried out in the process of determining the motion vector predictor candidate MVP1 in the left-neighboring region.

In the above embodiment it is determined in step S605, whether the motion vector of the j-th partition in the above-neighboring region is identical to the motion vector predictor candidate MVP1 in the left-neighboring region, but this determination may be omitted. In this case, the process of step S606 can be directly performed when the determination condition in step S604 is satisfied.

In one embodiment, the step S602 may be configured to increase the index j by an increment of two or more, thereby decimating the partitions to be scanned.

Figure 7:
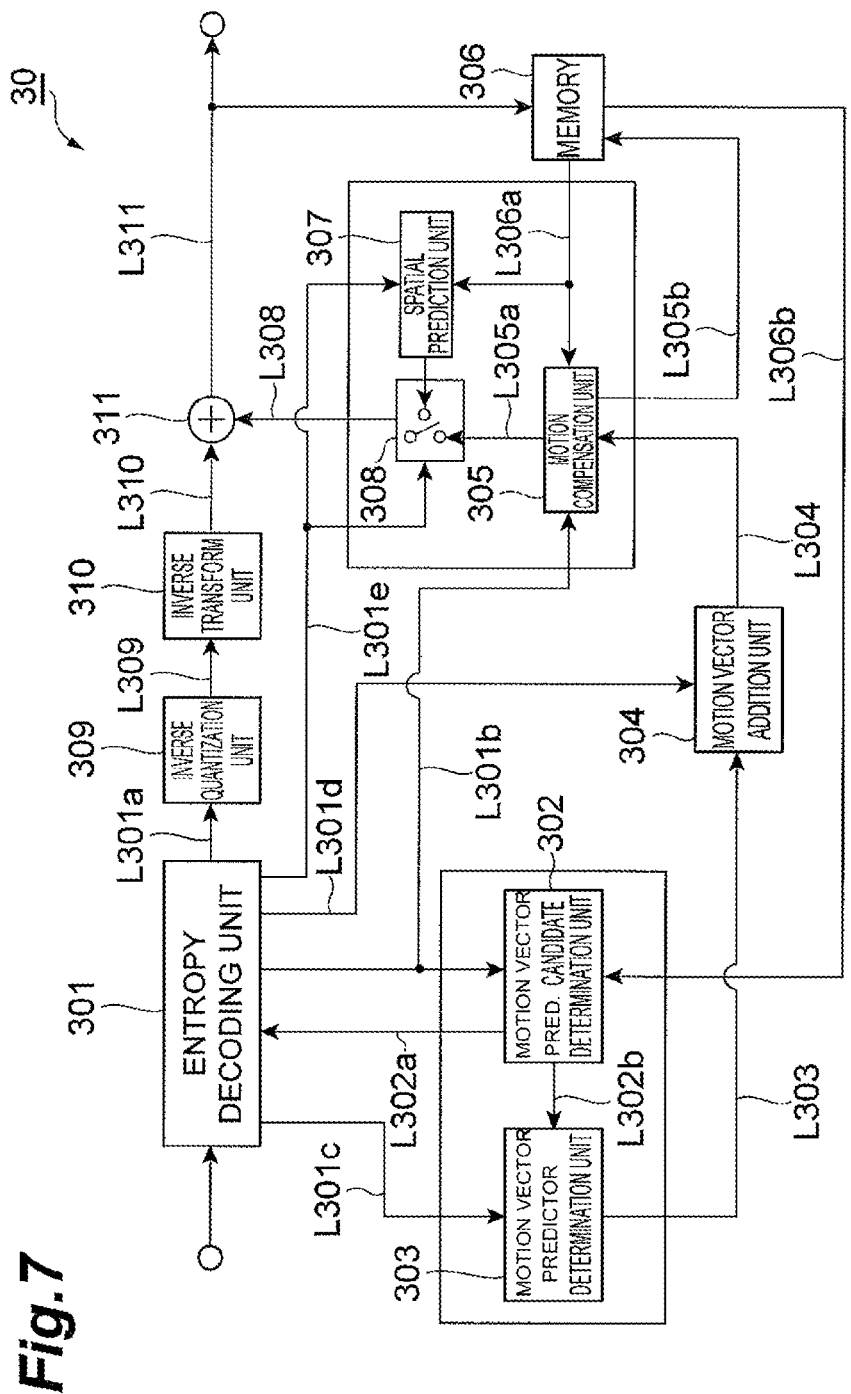
FIG. 7 is a drawing showing an example configuration of a video decoding device according to an embodiment.

The below will describe a video decoding device which decodes a compressed stream generated by the video encoding device 20, to restore a video sequence. FIG. 7 is a drawing showing an example configuration of the video decoding device according to one embodiment. The video decoding device 30 shown in FIG. 7 is an example of a device that predictively decodes a motion vector. video decoding device 30 may be a computing device or computer, including for example software, hardware, or a combination of hardware and software, as described later, capable of performing the described functionality. The video decoding device 30 may be one or more separate systems or devices included in the predictive coding system, or may be combined with other systems or devices within the predictive coding system. In other examples, fewer or additional blocks may be used to illustrate the functionality of the video decoding device 30.

As shown in FIG. 7, the video decoding device 30 can be provided with an entropy decoding unit 301, a motion vector predictor candidate determination unit 302, a motion vector predictor determination unit 303, a motion vector addition unit 304, a motion compensation unit 305, a frame memory 306, a spatial prediction unit 307, a prediction method determination unit 308, an inverse quantization unit 309, an inverse orthogonal transform unit 310, and an addition unit 311.

The entropy decoding unit 301 receives a compressed stream, then detects a synchronization word indicative of the beginning of each frame in the compressed stream, and thereafter restores the prediction mode information and the quantized orthogonal transform coefficients from encoded data in the compressed stream, in each of divided partition units. When the prediction mode specified by the prediction mode information is "inter-frame prediction mode," the entropy decoding unit 301 decodes the encoded data in the compressed stream to also restore the motion vector difference, reference picture list identification, and reference picture identification.

The entropy decoding unit 301 transmits the restored quantized orthogonal transform coefficients via line L301a to the inverse quantization unit 309. The entropy decoding unit 301 transmits the prediction mode information, the reference picture list identification, and the reference picture identification via line L301b to the motion vector predictor candidate determination unit 302. Furthermore, the entropy decoding unit 301 transmits the restored motion vector difference via line L301d to the motion vector addition unit 304. The entropy decoding unit 301 transmits the restored prediction mode information via line L301e to the prediction method determination unit 308.

When the prediction mode specified by the received prediction mode information is "inter-frame prediction mode," the motion vector predictor candidate determination unit 302 determines motion vector predictor candidates from motion vectors of previously-decoded neighboring partitions. Since the processing about the determination of motion vector predictor candidates carried out by the motion vector predictor candidate determination unit 302 is the same as the processing described above as to the motion vector predictor candidate determination unit 203, the description thereof is omitted herein. This motion vector predictor candidate determination unit 302 outputs the determined motion vector predictor candidates via line L302b to the motion vector predictor determination unit 303. Furthermore, the motion vector predictor candidate determination unit 302 outputs the number of motion vector predictor candidates via line L302a to the entropy decoding unit 301.

The entropy decoding unit 301, when receiving the number of motion vector predictor candidates via line L302a, decodes the encoded data in the compressed stream according to the number of motion vector predictor candidates, to restore the motion vector predictor indication information. The entropy decoding unit 301 transmits the restored motion vector predictor indication information to the motion vector predictor determination unit 303. For example, when the number of motion vector predictor candidates is 0 or 1, no motion vector predictor indication information is transmitted and therefore the restoring process is not carried out. When the number of motion vector predictor candidates is 2 or 3, the encoded data of two bits at most is entropy-decoded to restore the motion vector predictor indication information.

The entropy decoding unit 301 is configured to restore the motion vector predictor indication information by decoding the encoded data according to the number of motion vector predictor candidates selected by the motion vector predictor candidate determination unit 302, but the predictive coding system is not limited to this. For example, the motion vector predictor indication information may be restored using the fixed encoding table of Table 1 described above, independent of the number of motion vector predictor candidates. It should be noted that the setting of the fixed encoding table is not limited to this example. The motion vector predictor indication information may be restored prior to the calculation of motion vector predictor candidates.

The motion vector predictor determination unit 303 determines the optimum motion vector predictor (MVPopt) on the basis of the motion vector predictor indication information input via line L301c, out of the motion vector predictor candidates input via line L302b. The determined optimum motion vector predictor (MVPopt) is transmitted via line L303 to the motion vector addition unit 304.

The motion vector addition unit 304 performs addition of the motion vector difference transmitted from the entropy decoding unit 301 and the optimum motion vector predictor (MVPopt) transmitted from the motion vector predictor determination unit 303, to restore the motion vector. The motion vector addition unit 304 transmits a signal including the restored motion vector via line L304 to the motion compensation unit 305.

The motion compensation unit 305 selects the reference frame picture signal in the memory 306 on the basis of the motion vector transmitted from the motion vector addition unit 304 and the prediction mode information, the reference picture list identification, and the reference picture identification transmitted via line L301d from the entropy decoding unit 301, and generates a predicted picture signal, using the selected reference frame picture signal. The motion compensation unit 305 transmits the predicted picture signal via line L305a to the prediction method determination unit 308. Furthermore, the motion compensation unit 305 outputs the prediction mode information, reference picture list identification, and reference picture identification used in generation of the predicted picture signal via line L305b to the frame memory 306. There are the previously-decoded frame picture signals, prediction mode information, reference picture list identifications, and reference picture identifications stored in the memory 306.

When the prediction mode specified by the prediction mode information input via line L301e is "intra-frame prediction mode," the spatial prediction unit 307 generates a predicted picture signal with reference to the picture signals (reference frame picture signals) of previously-decoded neighboring partitions and transmits the predicted picture signal to the prediction method determination unit 308.

The prediction method determination unit 308 selects either of the predicted picture signal generated by the inter-frame prediction or the predicted picture signal generated by the intra-frame prediction, based on the prediction mode transmitted from the entropy decoding unit 301, and transmits the selected predicted picture signal via line L308 to the addition unit 311.

The inverse quantization unit 309 performs inverse quantization of the quantized orthogonal transform coefficients transmitted from the entropy decoding unit 301, to restore orthogonal transform coefficients. The inverse quantization unit 309 transmits the restored orthogonal transform coefficients via line L309 to the inverse orthogonal transform unit 310.

The inverse orthogonal transform unit 310 applies an inverse orthogonal transform to the received orthogonal transform coefficients to restore a prediction residual signal. The inverse orthogonal transform unit 310 transmits the restored prediction residual signal via line L310 to the addition unit 311.

The addition unit 311 performs addition of the predicted picture signal transmitted from the prediction method determination unit 308 and the prediction residual signal transmitted from the inverse orthogonal transform unit 310, to restore a frame picture signal.

The restored frame picture signal is output at predetermined display timing to a display device (not shown), whereby the input video signal (dynamic image signal) can be reproduced. Since the frame picture signal is used in the subsequent decoding process, it is stored as a reference frame picture signal into the memory 306. The frame picture signal herein can be the same value as the frame picture signal with the same number in the video encoding device 20. The information about the motion vector and the reference frame number is also simultaneously stored in association with the reference frame picture signal.

Figure 8:
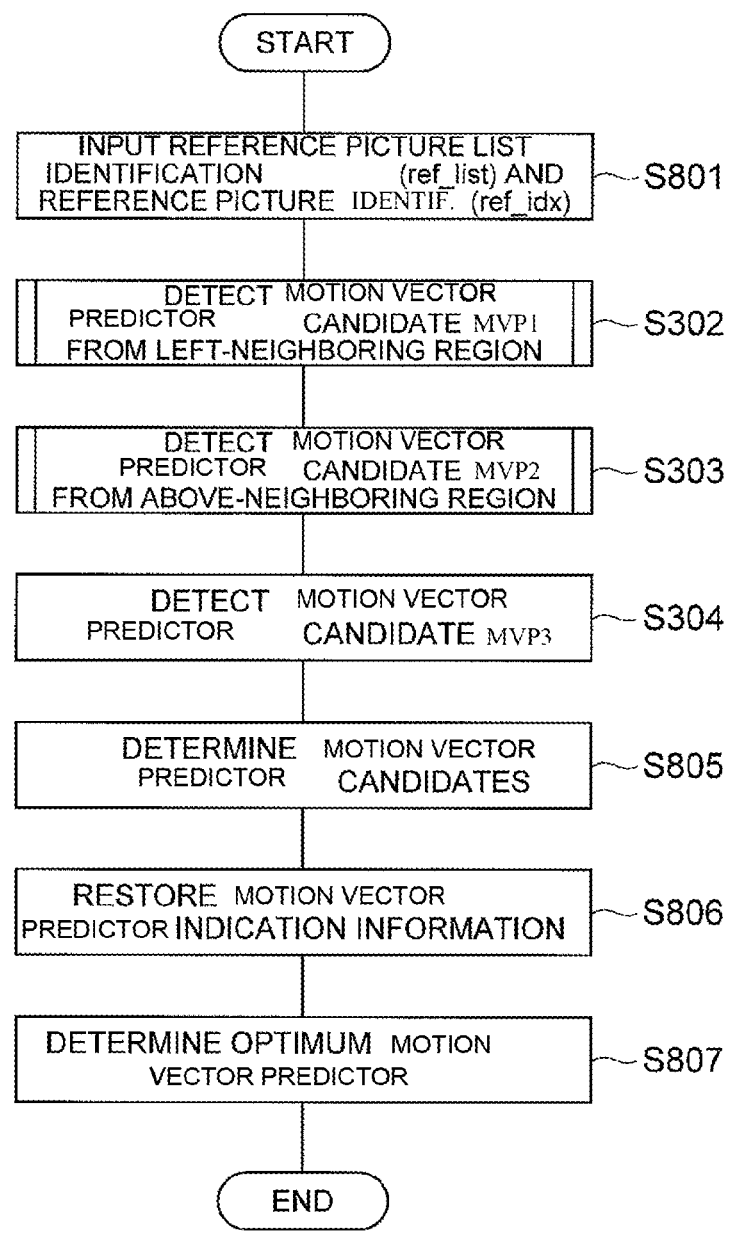
FIG. 8 is a flowchart showing an embodiment of an example of a predictive decoding method of motion vector.

Next, one embodiment of a predictive decoding method of motion vectors used in the video decoding device 30 will be described below with reference to FIG. 8. FIG. 8 is a flowchart showing an example embodiment of the predictive decoding method of motion vectors.

In the predictive decoding method of motion vector predictors according to one embodiment, as shown in the example of FIG. 8, the reference picture list identification and reference picture identification are first input into the motion vector predictor candidate determination unit 302 (step S801).

Next, the motion vector predictor candidate determination unit 302 determines a motion vector predictor candidate, MVP1, from a motion vector or motion vectors of one or more partitions included in a left-neighboring region located to the left of a target partition BT (step S302).

Next, the motion vector predictor candidate determination unit 302 determines a motion vector predictor candidate, MVP2, from a motion vector or motion vectors of one or more partitions included in the above-neighboring region located above the target partition BT (step S303).

Next, the motion vector predictor candidate determination unit 302 determines a motion vector predictor candidate MVP3 (step S304). The processes of steps S302 to S304 in FIG. 8 are the same as the processes of steps S302 to S304 in FIG. 3.

In step S805, the motion vector predictor candidate determination unit 302 then defines as motion vector predictor candidates only non-identical motion vector predictor candidates from among the motion vector predictor candidate MVP1, the motion vector predictor candidate MVP2, and the motion vector predictor candidate MVP3. As a specific example, where the motion vector predictor candidate MVP1 is identical to the motion vector predictor candidate MVP3, only the motion vector predictor candidate MVP1 and the motion vector predictor candidate MVP2 are selected as motion vector predictor candidates. When the processing up to step S805 results in determining no effective motion vector predictor candidates, a zero motion vector is defined as a motion vector predictor candidate.

In step S806, as described above, the decoding unit 301 restores the motion vector predictor indication information on the basis of the number of motion vector predictor candidates. Next, in step S807, the motion vector predictor determination unit 303 selects the optimum motion vector predictor out of the motion vector predictor candidates, based on the motion vector predictor indication information.

Figure 9:
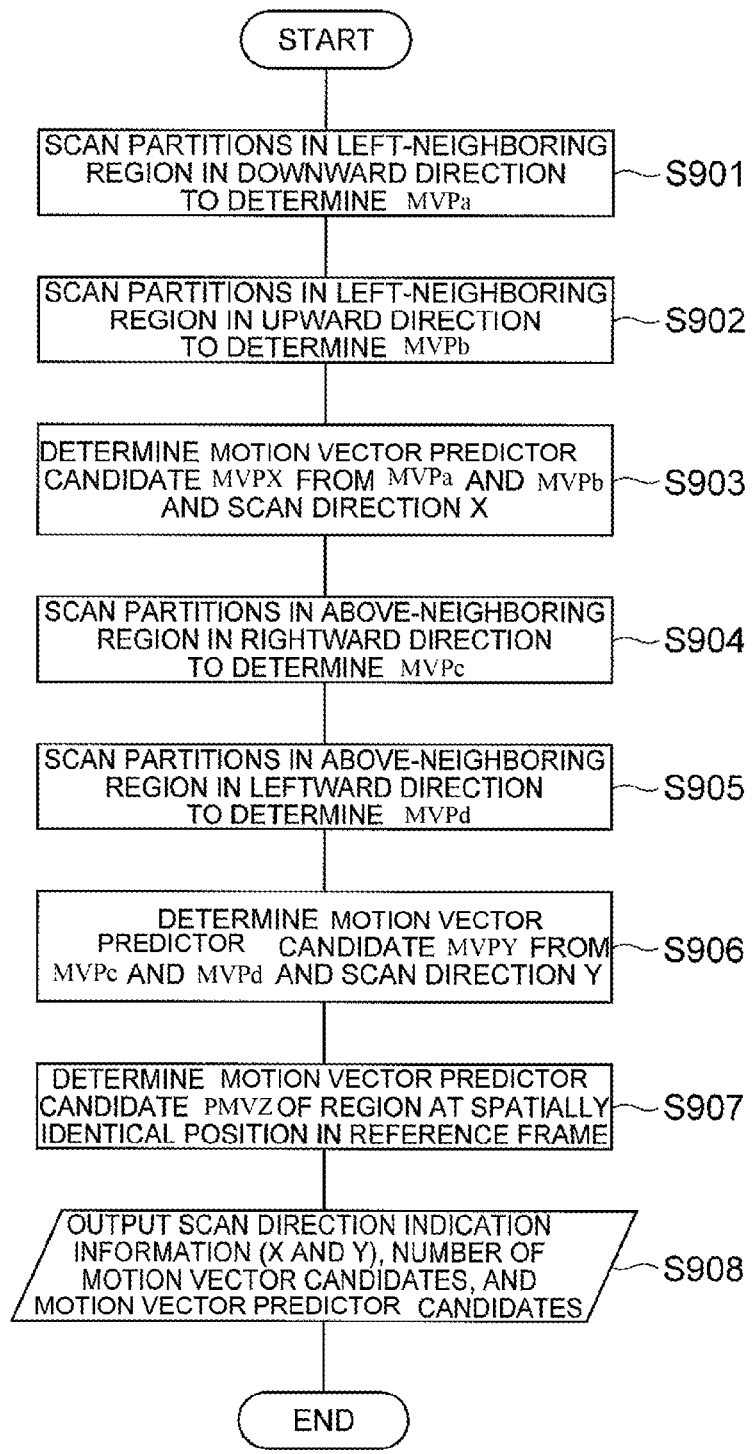
FIG. 9 is a flowchart showing an example of a determination process of motion vector predictor candidates in a predictive encoding method of motion vector in a second embodiment.

Next, a second embodiment of the predictive encoding method of motion vectors will be described below. FIG. 9 is a flowchart showing an example of the determination process of motion vector predictor candidates in the predictive encoding method of motion vectors in the second embodiment. In the predictive encoding method of motion vectors according to the second embodiment, the flow shown in FIG. 9 is used instead of steps S302 to S304 in FIG. 3.

In the present embodiment, in step S901 the motion vector predictor candidate determination unit 203 first scans the partitions in the left-neighboring region located to the left of the target partition in a downward direction to determine a motion vector predictor candidate MVPa from the motion vectors of these partitions. In step S901, the motion vector predictor candidate determination unit 203 can detect the motion vector predictor candidate MVPa by carrying out the determination method of the motion vector predictor candidate MVP1 (step S302) described in the first embodiment, according to the scan order of the left-neighboring region shown in (c) of FIG. 4. For determining the motion vector predictor candidate MVPa, the motion vector predictor candidate determination unit 203 can use the input reference picture list identification and reference picture identification, as in the first embodiment.

Next, in step S902 the motion vector predictor candidate determination unit 203 scans the partitions in a left-neighboring region located to the left of the target partition in an upward direction to determine a motion vector predictor candidate MVPb from the motion vectors of these partitions. In step S902, the motion vector predictor candidate determination unit 203 can detect the motion vector predictor candidate MVPb by carrying out the determination method of the motion vector predictor candidate MVP1 (step S302) described in the first embodiment, according to the scan order of the left-neighboring region shown in (a) of FIG. 4. For determining the motion vector predictor candidate MVPb, the motion vector predictor candidate determination unit 203 can use the reference picture list identification and reference picture identification.

Next, in step S903 the motion vector predictor candidate determination unit 203 selects a motion vector predictor candidate MVPX in the left-neighboring region from the motion vector predictor candidate MVPa and the motion vector predictor candidate MVPb. Furthermore, the motion vector predictor candidate determination unit 203 generates scan direction indication information indicative of a scan direction X used for determination of the selected motion vector predictor candidate. Specifically, the motion vector predictor candidate determination unit 203 determines as the motion vector predictor candidate MVPX, a motion vector predictor candidate with the smallest error from the motion vector predictor of the target partition, out of motion vector predictor candidate MVPa and motion vector predictor candidate MVPb. Furthermore, when the motion vector predictor candidate MVPa is selected as the motion vector predictor candidate MVPX, the motion vector predictor candidate determination unit 203 generates the scan direction indication information indicative of a direction such as the downward direction; whereas when the motion vector predictor candidate MVPb is selected, it generates the scan direction indication information indicative of another direction such as the upward direction.

Next, in step S904 the motion vector predictor candidate determination unit 203 scans the partitions in the above-neighboring region to the target partition in a rightward direction to determine a motion vector predictor candidate MVPc from the motion vectors of these partitions. In step S904 the motion vector predictor candidate determination unit 203 can detect the motion vector predictor candidate MVPc by carrying out the determination method of the motion vector predictor candidate MVP2 (step S303) described in the first embodiment, according to the scan order of the above-neighboring region shown in (c) of FIG. 4. For determining the motion vector predictor candidate MVPc, the motion vector predictor candidate determination unit 203 can use the input reference picture list identification and reference picture identification, as in the first embodiment.

Next, in step S905 the motion vector predictor candidate determination unit 203 scans the partitions in the above-neighboring region to the target partition in a leftward direction to determine a motion vector predictor candidate MVPd from motion vectors of these partitions. In step S905, the motion vector predictor candidate determination unit 203 can detect the motion vector predictor candidate MVPd by carrying out the determination method (step S303) of the motion vector predictor candidate MVP2 described in the first embodiment, according to the scan order of the above-neighboring region shown in (a) of FIG. 4. For determining the motion vector predictor candidate MVPd, the motion vector predictor candidate determination unit 203 can also use the reference picture list identification and reference picture identification.

Next, in step S906 the motion vector predictor candidate determination unit 203 selects a motion vector predictor candidate MVPY in the above-neighboring region from the motion vector predictor candidate MVPc and the motion vector predictor candidate MVPd. The motion vector predictor candidate determination unit 203 generates the scan direction indication information indicative of the scan direction Y used for determination of the selected motion vector predictor candidate. For example, the motion vector predictor candidate determination unit 203 can determine a motion vector predictor candidate with the smallest error from the motion vector predictor of the target partition, out of the motion vector predictor candidate MVPc and the motion vector predictor candidate MVPd, as the motion vector predictor candidate MVPY. When the motion vector predictor candidate MVPc is selected as the motion vector predictor candidate MVPY, the motion vector predictor candidate determination unit 203 generates the scan direction indication information indicative of the rightward direction; when the motion vector predictor candidate MVPd is selected, it generates the scan direction indication information indicative of the leftward direction.

Next, in step S907 the motion vector predictor candidate determination unit 203 acquires a motion vector predictor candidate MVPZ of a partition in a reference frame at a position spatially identical to the target partition, in the same manner as the process of step S304. The process in this step S907 may be the same as the aforementioned modification form of the process of step S304 in the first embodiment.

Next, in step S908 the motion vector predictor candidate determination unit 203 defines only non-identical motion vector predictor candidates out of the motion vector predictor candidate MVPX, the motion vector predictor candidate MVPY, and the motion vector predictor candidate MVPZ, as motion vector predictor candidates. Then the motion vector predictor candidate determination unit 203 outputs the motion vector predictor candidates, the number of motion vector predictor candidates, and the scan direction indication information. As a specific example, where the motion vector predictor candidate MVPX is identical to the motion vector predictor candidate MVPZ, only the motion vector predictor candidate MVPX and the motion vector predictor candidate MVPY are selected as motion vector predictor candidates. If no effective motion vector predictor candidate is determined in steps S901 to S907, a zero motion vector is defined as a motion vector predictor candidate.

Thereafter, the same processing as in step S306 in the first embodiment is carried out in the second embodiment. Finally, in step S307 the encoding unit 213 encodes the motion vector predictor indication information to specify which motion vector predictor candidate is the optimum motion vector predictor. In the second embodiment the encoding unit 213 also encodes the scan direction indication information in step S307.

In the second embodiment, the partitions constituting the left-neighboring region and the partitions constituting the above-neighboring region may be modified as described above in the first embodiment. The number of motion vector predictors may also be changed as described above in the first embodiment. As described above in the first embodiment, the determination order of the motion vector predictor candidates MVPX, MVPY, and MVPZ may be changed based on the mode of division of the target partition into sub-partitions and the positions of the sub-partitions.

Figure 10:
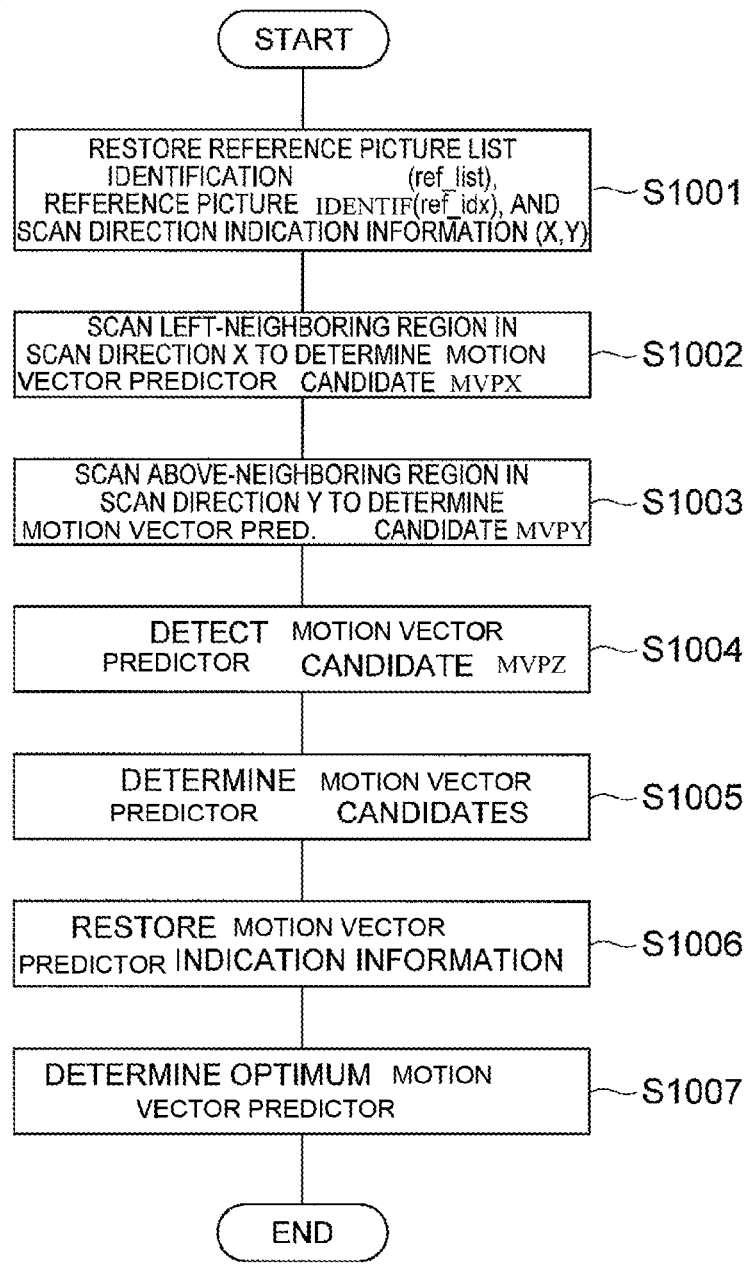
FIG. 10 is a flowchart showing an example of a predictive decoding method of motion vector in the second embodiment.

A predictive decoding method of motion vectors according to the second embodiment will be described below. FIG. 10 is a flowchart showing an example of the predictive decoding method of motion vectors according to the second embodiment. The predictive decoding method shown in FIG. 10 is a method of predicting a motion vector from encoded data generated by the predictive encoding method of motion vectors according to the second embodiment.

In the present embodiment, as shown in FIG. 10, in step S1001 the motion vector predictor candidate determination unit 302 first receives input of the restored reference picture list identification, reference picture identification, and scan direction indication information (scan direction X, scan direction Y).

Next, in step S1002 the motion vector predictor candidate determination unit 302 determines a motion vector predictor candidate MVPX in the left-neighboring region, according to the reference picture list identification, the reference picture identification, and the scan direction indication information to specify the scan direction X. The motion vector predictor candidate MVPX is determined by the same process as the determination of the motion vector predictor candidate MVP1 in the first embodiment, by sequentially scanning the partitions in the left-neighboring region in the scan direction X specified by the scan direction indication information.

Next, in step S1003, the motion vector predictor candidate determination unit 302 determines a motion vector predictor candidate MVPY in the above-neighboring region, according to the reference picture list identification, the reference picture identification, and the scan direction indication information to specify the scan direction Y. The motion vector predictor candidate MVPY is determined by the same process as the determination of the motion vector predictor candidate MVP2 in the first embodiment, by sequentially scanning the partitions in the above-neighboring region in the scan direction Y specified by the scan direction indication information.

Next, in step S1004 the motion vector predictor candidate determination unit 302 determines a motion vector predictor candidate MVPZ of a partition in a reference frame spatially substantially identical to the target partition. The process of step S1004 is the same as the process of step 304.

Next, in step S1005 the motion vector predictor candidate determination unit 302 defines only non-identical motion vector predictor candidates, out of the motion vector predictor candidate MVPX, the motion vector predictor candidate MVPY, and the motion vector predictor candidate MVPZ, as motion vector predictor candidates. As a specific example, where the motion vector predictor candidate MVPX is identical to the motion vector predictor candidate MVPZ, only the motion vector predictor candidate MVPX and the motion vector predictor candidate MVPY are selected as motion vector predictor candidates. If no effective motion vector predictor candidates are determined by the processing up to step S1005, a zero motion vector is defined as a motion vector predictor candidate.

Next, in step S1006 the decoding unit 301 restores the motion vector predictor indication information on the basis of the number of motion vector predictor candidates. In step S1007, the motion vector predictor determination unit 303 then selects the optimum motion vector predictor from among the motion vector predictor candidates, based on the motion vector predictor indication information.

In the second embodiment, the determination order of the motion vector predictor candidates MVPX, MVPY, and MVPZ may also be changed based on the mode of division of the target partition into sub-partitions and the positions of the sub-partitions, as described above in the first embodiment.

The video encoding device 20 and video decoding device 30 described above are configured to narrow down candidates for a motion vector predictor and then detect the optimum motion vector predictor from the resulting motion vector predictor candidates. Therefore, it is possible to reduce the computational complexity necessary for the determination of the optimum motion vector predictor. Furthermore, the motion vector predictor indication information to specify the optimum motion vector predictor can be encoded in a smaller bit count.

The video encoding device 20 and the video decoding device 30 using the predictive encoding and predictive decoding of the second embodiment are able to determine the motion vector predictor candidates with a smaller error from the motion vector of the target partition.

The below will describe a video encoding program 1000 for causing a computer to function as the video encoding device 20, and a video decoding program 1100 for causing a computer to function as the aforementioned video decoding device 30.

Figure 11:
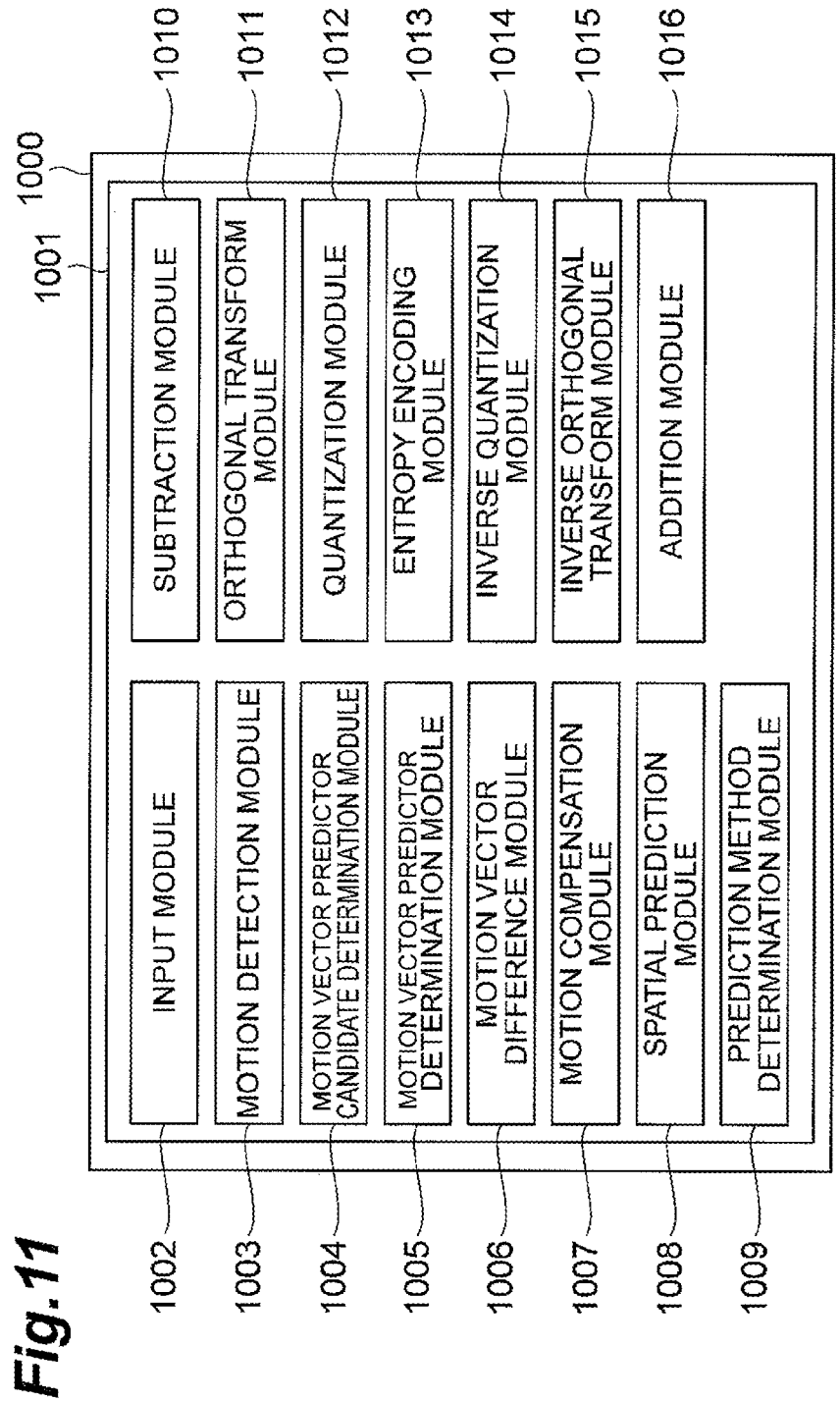
FIG. 11 is a drawing showing an example configuration of a video encoding program according to one embodiment.
Figure 12:
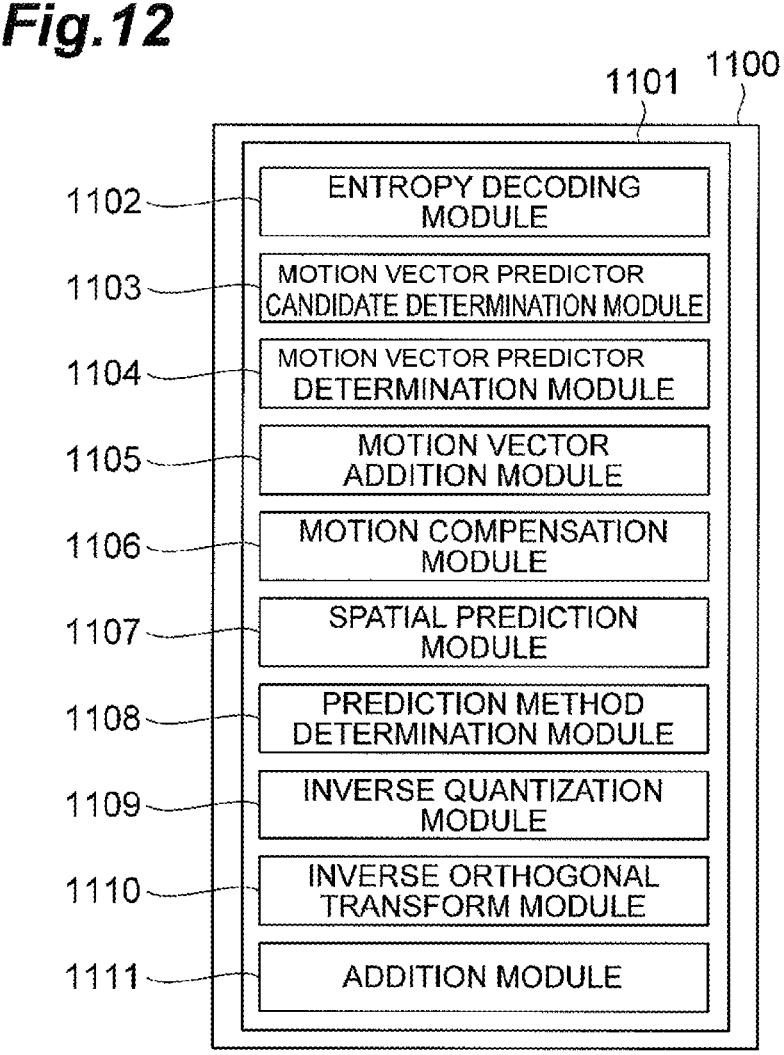
FIG. 12 is a drawing showing an example configuration of a video decoding program according to one embodiment.
Figure 13:
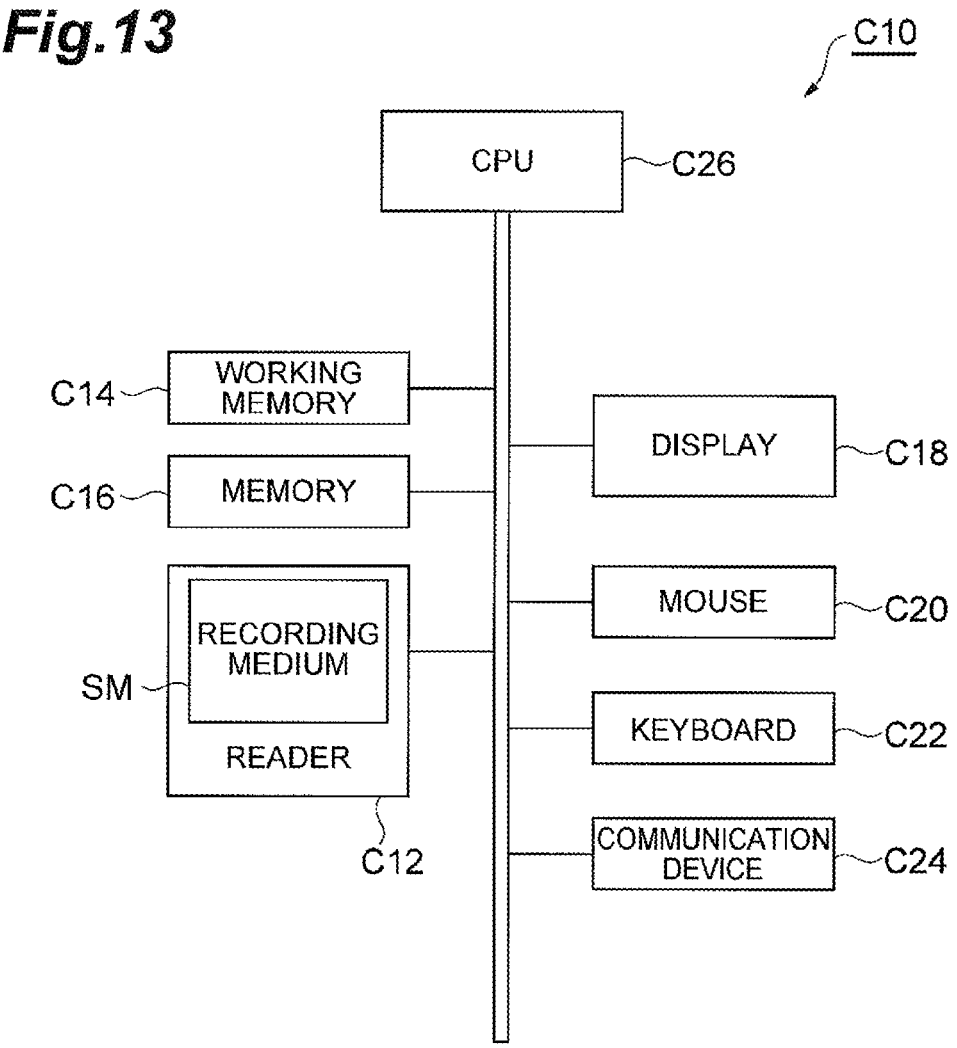
FIG. 13 is a drawing showing an example of a hardware configuration of a computer according to one embodiment.
Figure 14:
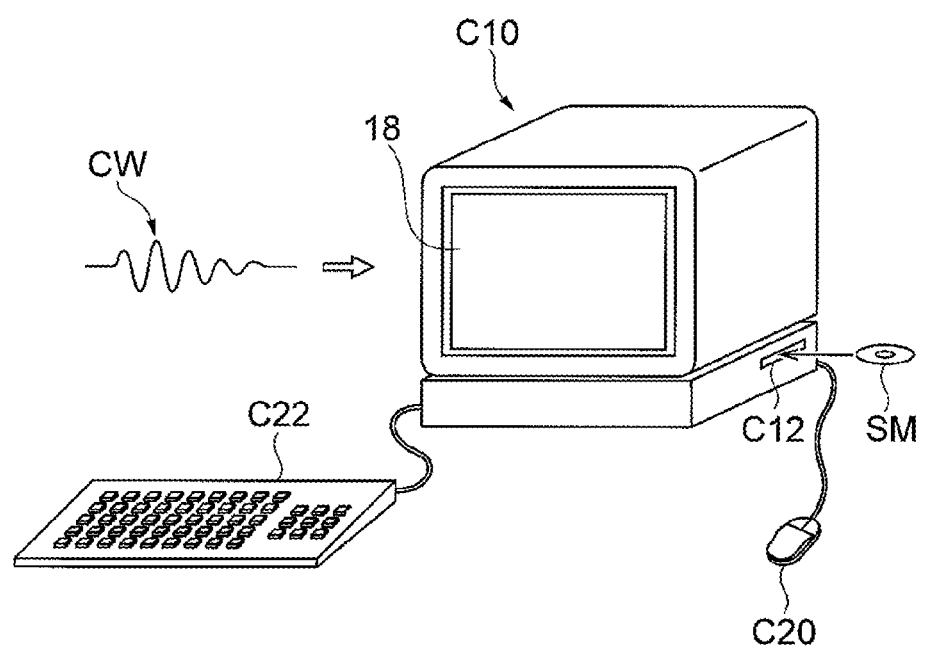
FIG. 14 is a perspective view showing an example of a computer according to one embodiment.

FIG. 11 is a drawing showing a configuration of an example of the video encoding program according to at least one embodiment. FIG. 12 is a drawing showing a configuration of an example of the video decoding program according to at least one embodiment. FIG. 13 is a drawing showing an example hardware configuration of a computer according to at least one embodiment. FIG. 14 is a perspective view showing an example of a computer according to at least one embodiment.

At least part of the video encoding program 1000 shown in FIG. 11 can be provided as stored in a recording medium SM. Furthermore, at least part of the video decoding program 1100 shown in FIG. 12 can also be provided as stored in a recording medium SM. Examples of such recording media SM applicable herein include recording media such as the floppy disk, CD-ROM, DVD, or ROM, semiconductor memories, or the like.

As shown in FIG. 13, a computer C10 can be provided with a reading device C12 such as a floppy disk drive unit, a CD-ROM drive unit, or a DVD drive unit, a communication port such as a universal serial bus port (USB), Bluetooth port, an infrared communication port, or any other type of communication port that allows communication with an external device, such as another computer or memory device.

The computer 30 may also include a working memory C14 that may include an operating system, a memory C16 that stores data, such as at least part of a program such as a program stored in a recording medium SM. In addition, the working memory C14 and/or the memory C16 may include the memory 207 and the memory 306. The working memory C14 and memory C16 may be one or more non-transitory computer readable storage medium, and can include a solid-state memory such as a memory card or other package that houses one or more non-volatile memories, such as read-only memories. Further, the computer readable medium can include a random access memory or other volatile rewritable memory. Additionally or alternatively, the computer-readable medium can include a magneto-optical or optical medium, such as a disk or tapes or any other non-transitory information storage medium to capture carrier wave signals such as a signal communicated over a transmission medium. A digital file attachment to an e-mail, stored in a storage medium, or other self-contained information archive or set of archives may be considered a non-transitory distribution medium that is a tangible computer readable storage medium. Accordingly, the embodiments are considered to include any one or more of a computer-readable storage medium or a non-transitory distribution storage medium and other equivalents and successor information storage media, in which data or instructions may be stored. In addition, the computer C10 may have a user interface that includes a monitor unit C18 such as a display, a mouse C20 and a keyboard C22 as input devices, a touch screen display, a microphone for receipt of voice commands, a sensor, or any other mechanism or device that allows a user to interface with the computer C10. In addition, the computer C10 may include a communication device C24 for transmission/reception of data and others, and a central processing unit (CPU) C26, or processor, to control execution of the program. The processor C26 may be one or more one or more general processors, digital signal processors, application specific integrated circuits, field programmable gate arrays, digital circuits, analog circuits, combinations thereof, and/or other now known or later developed devices for analyzing and processing data.

In an example, when the recording medium SM is put into the reading device C12, the computer C10 becomes accessible to the video encoding program 1000 stored in the recording medium SM, through the reading device C12 and becomes able to operate as the video encoding device 20, based on the program 1000.

In an example, when the recording medium SM is put into the reading device C12, the computer C10 becomes accessible to the video decoding program 1100 stored in the recording medium SM, through the reading device C12 and becomes able to operate as the video decoding device 30, based on the program 1100.

As shown in the example of FIG. 11, the video encoding program 1000 is provided with a main module 1001 to generally control the processing, an input module 1002, a motion detection module 1003, a motion vector predictor candidate determination module 1004, a motion vector predictor determination module 1005, a motion vector difference module 1006, a motion compensation module 1007, a spatial prediction module 1008, a prediction method determination module 1009, a subtraction module 1010, an orthogonal transform module 1011, a quantization module 1012, an entropy encoding module 1013, an inverse quantization module 1014, an inverse orthogonal transform module 1015, and an addition module 1016. The functions that the input module 1002, the motion detection module 1003, the motion vector predictor candidate determination module 1004, the motion vector predictor determination module 1005, the motion vector difference module 1006, the motion compensation module 1007, the spatial prediction module 1008, the prediction method determination module 1009, the subtraction module 1010, the orthogonal transform module 1011, the quantization module 1012, the entropy encoding module 1013, the inverse quantization module 1014, the inverse orthogonal transform module 1015, and the addition module 1016 causes a computer, or processor to implement at least some of the functions of the aforementioned input unit 201, motion detection unit 202, motion vector predictor candidate determination unit 203, motion vector predictor determination unit 204, motion vector difference unit 205, motion compensation unit 206, spatial prediction unit 208, prediction method determination unit 209, subtraction unit 210, orthogonal transform unit 211, quantization unit 212, entropy encoding unit 213, inverse quantization unit 214, inverse orthogonal transform unit 215, and addition unit 216, respectively.

As shown in the example of FIG. 12, the video decoding program 1100 is provided with a main module 1101 to generally control the processing, an entropy decoding module 1102, a motion vector predictor candidate determination module 1103, a motion vector predictor determination module 1104, a motion vector addition module 1105, a motion compensation module 1106, a spatial prediction module 1107, a prediction method determination module 1108, an inverse quantization module 1109, an inverse orthogonal transform module 1110, and an addition module 1111. The functions that the entropy decoding module 1102, motion vector predictor candidate determination module 1103, motion vector predictor determination module 1104, motion vector addition module 1105, motion compensation module 1106, spatial prediction module 1107, prediction method determination module 1108, inverse quantization module 1109, inverse orthogonal transform module 1110, and addition module 1111 causes a computer or processor to implement at least some of the functions of the aforementioned entropy decoding unit 301, motion vector predictor candidate determination unit 302, motion vector predictor determination unit 303, motion vector addition unit 304, motion compensation unit 305, spatial prediction unit 307, prediction method determination unit 308, inverse quantization unit 309, inverse orthogonal transform unit 310, and addition unit 311, respectively.

The previous discussion describes various embodiments of the predictive coding system, but the predictive coding system can be modified in many ways without being limited to the above embodiments. For example, in the above embodiments the encoded data of the motion vector difference is the difference between the motion vector of the target partition and the motion vector predictor (optimum motion vector predictor), which is transmitted from the encoding device to the decoding device, but the optimum motion vector predictor may be adopted as the motion vector of the target partition, without transmitting the encoded data of the motion vector difference from the encoding device to the decoding device.

The motion vector predictor candidate MVPX may be determined as follows: predicted picture signals can be created using the motion vector predictor candidates MVPa and MVPb and the motion vector predictor candidate MVPX to be adopted is a motion vector predictor candidate to make smaller the sum of absolute differences (SAD) between the predicted picture signal and the picture signal of the target partition, out of the motion vector predictor candidates MVPa and MVPb. The motion vector predictor candidate MVPY may be determined as follows: predicted picture signals are created using the motion vector predictor candidates MVPc and MVPd and the motion vector predictor candidate MVPY to be adopted is a motion vector predictor candidate to make smaller the sum of absolute differences (SAD) between the predicted picture signal and the picture signal of the target partition, out of the motion vector predictor candidates MVPc and PMCd. Furthermore, the sum of absolute transformed differences (SATD) or the sum of square differences (SSD) may be used instead of SAD.

REFERENCE SIGNS LIST 20 video encoding device; 30 video decoding device; 201 input unit; 202 detection unit; 203 motion vector predictor candidate determination unit; 204 motion vector predictor determination unit; 205 motion vector difference unit; 206 motion compensation unit; 207 memory; 208 spatial prediction unit; 209 prediction method determination unit; 210 subtraction unit; 211 transform unit; 212 quantization unit; 213 entropy encoding unit; 214 inverse quantization unit; 215 inverse transform unit; 216 addition unit; 301 entropy decoding unit; 302 motion vector predictor candidate determination unit; 303 motion vector predictor determination unit; 304 motion vector addition unit; 305 motion compensation unit; 306 frame memory; 307 spatial prediction unit; 308 prediction method determination unit; 309 inverse quantization unit; 310 inverse orthogonal transform unit; 311 addition unit.

The invention claimed is:

1. A method for predictively decoding a motion vector used in motion compensated prediction to restore a video sequence consisting of a temporal sequence of a plurality of frame pictures, comprising:
   a step of determining a first motion vector predictor candidate that satisfies a first predetermined criterion used in determination of motion vector predictor candidates, from a motion vector of one or more partitions belonging to a left-neighboring region located on a left side of a target partition in a frame picture of a decoding target;
   a step of determining a second motion vector predictor candidate satisfying a second predetermined criterion used in determination of motion vector predictor candidates, from a motion vector of one or more partitions belonging to an above-neighboring region located above the target partition;
   a step of decoding encoded data to restore motion vector predictor indication information specifying a motion vector predictor for the target partition; and
   a step of selecting the motion vector predictor specified by the motion vector predictor indication information, from one or more motion vector predictor candidates including at least the first motion vector predictor candidate and the second motion vector predictor candidate;
   wherein the step of determining the first motion vector predictor candidate comprises:
      scanning a plurality of partitions included in the left-neighboring region, in an upward direction from a bottom of the left-neighboring region, thus determining, a motion vector satisfying the first predetermined criterion used in determination of motion vector predictor candidates, as the first motion vector predictor candidate, from the motion vector of said one or more partitions included in the left-neighboring region,
      determining both an i-th partition and the target partition have a same reference picture list identification number and reference picture identification number, after confirming the i-th partition is present in a scan order in the left-neighboring region and said i-th partition has a motion vector, and
      selecting the motion vector of the i-th partition as the first motion vector predictor candidate, based on determining both the i-th partition and the target partition have the same reference picture list identification number and reference picture identification number.

2. A device for predictively decoding a motion vector used in motion compensated prediction to restore a video sequence consisting of a temporal sequence of a plurality of frame pictures, comprising:
   a first motion vector predictor candidate determination unit adapted to determine a first motion vector predictor candidate satisfying a first predetermined criterion used in determination of motion vector predictor candidates from a motion vector of one or more partitions belonging to a left-neighboring region located on a left side of a target partition in a frame picture of a decoding target;
   a second motion vector predictor candidate determination unit adapted to determine a second motion vector predictor candidate satisfying a second predetermined criterion used in determination of motion vector predictor candidates from a motion vector of one or more partitions belonging to an above-neighboring region located above the target partition;
   a decoding unit adapted to decode encoded data to restore motion vector predictor indication information specifying a motion vector predictor for the target partition; and
   motion vector predictor determination unit adapted to select the motion vector predictor specified by the motion vector predictor indication information, from one or more motion vector predictor candidates including at least the first motion vector predictor candidate and the second motion vector predictor candidate,
   wherein the first motion vector predictor candidate determination unit is adapted to scan one or more partitions included in the left-neighboring region, in an upward direction from a bottom of the left-neighboring region, to determine a motion vector satisfying the first predetermined criterion used in determination of motion vector predictor candidates, as the first motion vector predictor candidate, from the motion vector of said one or more partitions included in the left-neighboring region,
   and to determine both a i-th partition and the target partition have a same reference picture list identification number and reference picture identification number, in response to the i-th partition being present in a scan order in the left-neighboring region and said i-th partition having a motion vector, and
   the first motion vector predictor candidate determination unit further adapted to select the motion vector of the i-th partition as the first motion vector predictor candidate, in response to the determination that both the i-th partition and the target partition have the same reference picture list identification number and reference picture identification number.

* * * * *